(12) United States Patent
Kato et al.

(10) Patent No.: US 8,324,779 B2
(45) Date of Patent: Dec. 4, 2012

(54) MOTOR

(75) Inventors: Shigemasa Kato, Toyohashi (JP); Seiya Yokoyama, Toyohashi (JP); Yoji Yamada, Hamamatsu (JP); Yoshiaki Takemoto, Toyohashi (JP); Keisuke Koide, Kosai (JP); Shinji Santo, Kosai (JP)

(73) Assignee: ASMO Co., Ltd., Kosai-shi, Shizuoka-ken (JP)

( * ) Notice: Subject to any disclaimer, the term of this patent is extended or adjusted under 35 U.S.C. 154(b) by 119 days.

(21) Appl. No.: 12/897,905

(22) Filed: Oct. 5, 2010

(65) Prior Publication Data
US 2011/0140562 A1    Jun. 16, 2011

(30) Foreign Application Priority Data

Oct. 7, 2009 (JP) ................. 2009-233441
Nov. 4, 2009 (JP) ................. 2009-253139
Jun. 30, 2010 (JP) ................. 2010-148914

(51) Int. Cl.
*H02K 21/12* (2006.01)

(52) U.S. Cl. ................. 310/156.57

(58) Field of Classification Search . 310/156.01–156.84
See application file for complete search history.

(56) References Cited

U.S. PATENT DOCUMENTS

| | | | |
|---|---|---|---|
| 5,508,576 A * | 4/1996 | Nagate et al. | ............ 310/156.54 |
| 5,631,512 A | 5/1997 | Kawabata et al. | |
| 5,682,073 A | 10/1997 | Mizuno | |
| 6,867,524 B2 | 3/2005 | Liang | |
| 7,327,062 B2 * | 2/2008 | Kaneko | .................... 310/156.57 |
| 7,755,243 B2 | 7/2010 | Mizutani et al. | |
| 7,923,881 B2 * | 4/2011 | Ionel et al. | ............... 310/156.83 |
| 8,084,911 B2 | 12/2011 | Takemoto et al. | |
| 2006/0097594 A1 | 5/2006 | Abou-Akar et al. | |
| 2010/0133939 A1 | 6/2010 | Takemoto et al. | |

FOREIGN PATENT DOCUMENTS

JP    9-327139 A    12/1997

OTHER PUBLICATIONS

Specification and drawings from U.S. Appl. No. 13/185,081, filed Jul. 18, 2011.
Abstract from U.S. Appl. No. 12/752,755, filed Apr. 1, 2010. Asmo Co., LTD. Inventor: Yoji Yamada et al.

* cited by examiner

*Primary Examiner* — Nguyen N Hanh
(74) *Attorney, Agent, or Firm* — Marsh Fischmann & Breyfogle LLP

(57) ABSTRACT

A motor having a rotor and a stator is disclosed. The rotor is a consequent-pole rotor having a rotor core, a plurality of magnets, and a plurality of salient poles. The stator includes a plurality of teeth. A first auxiliary groove is formed in a surface of each salient pole that is opposed to the teeth. Each first auxiliary groove has first and second side surfaces facing each other in the circumferential direction. The first side surface is closer to a circumferential center of the salient pole than the second side surface. When the angle from the circumferential center line to the first side surface of each salient pole about the axis of the rotor is represented by KC1, the opening angle between the circumferential ends of the distal end of each tooth about the axis is represented by KA, and the opening angle between the circumferential ends of each salient pole about the axis is represented by KB, the following expression is satisfied: $KC1 = KA - KB/2$.

10 Claims, 22 Drawing Sheets

Fig.7A
Fig.7B
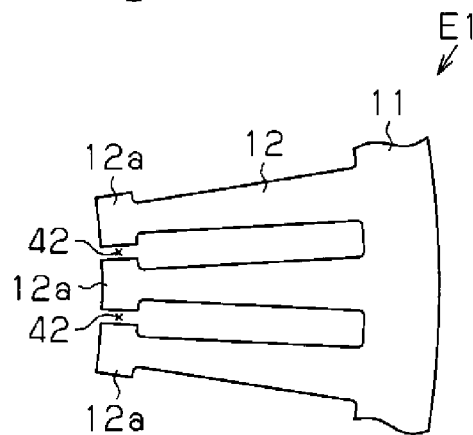
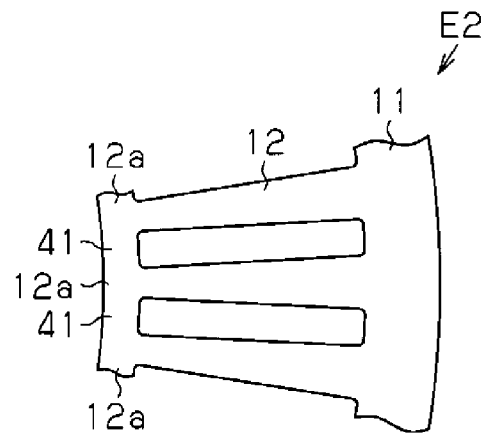
Fig.7C
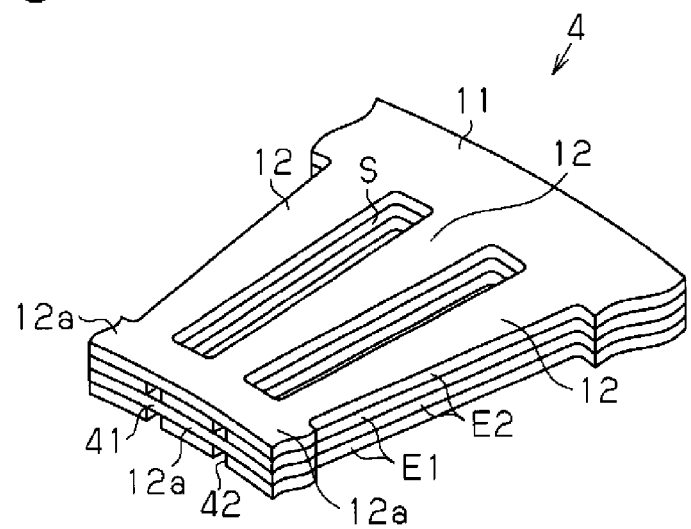
Fig.7D
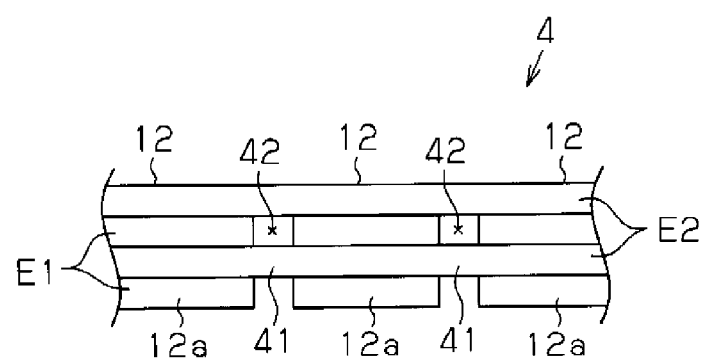

Rotational Angle : R1

Rotational Angle : R2

Fig.18A
Fig.18B
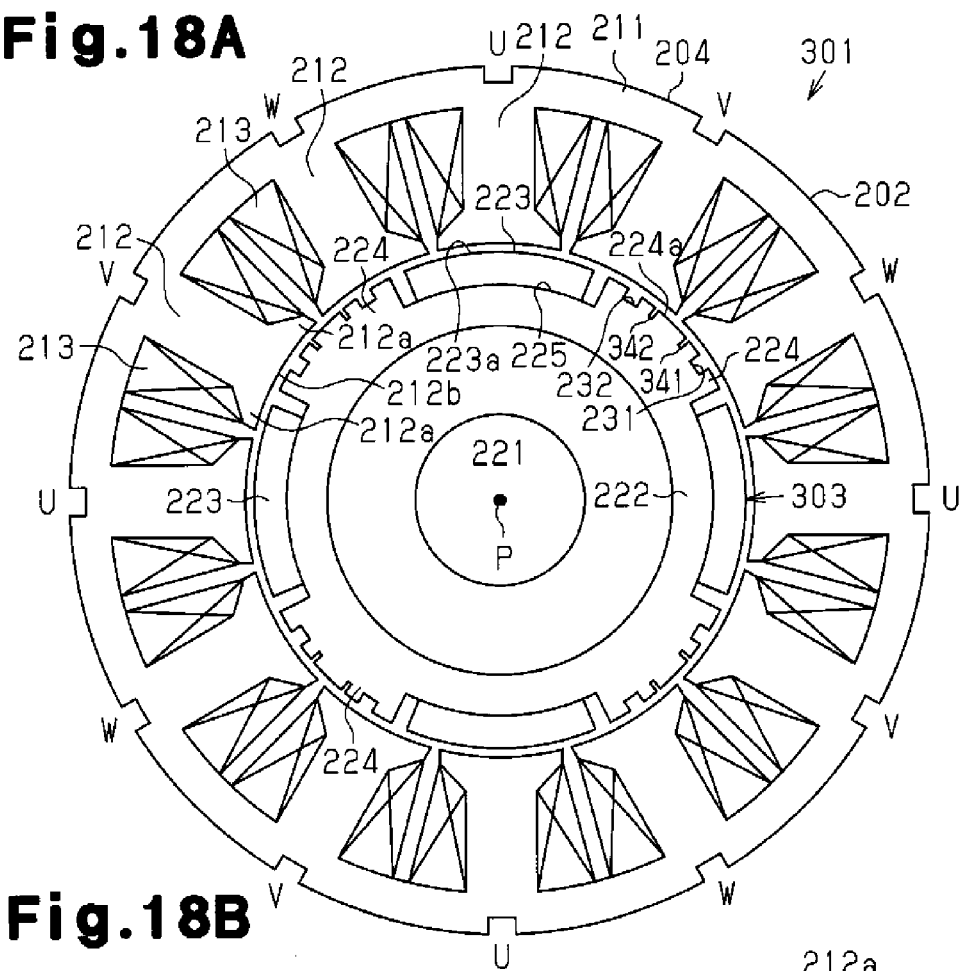
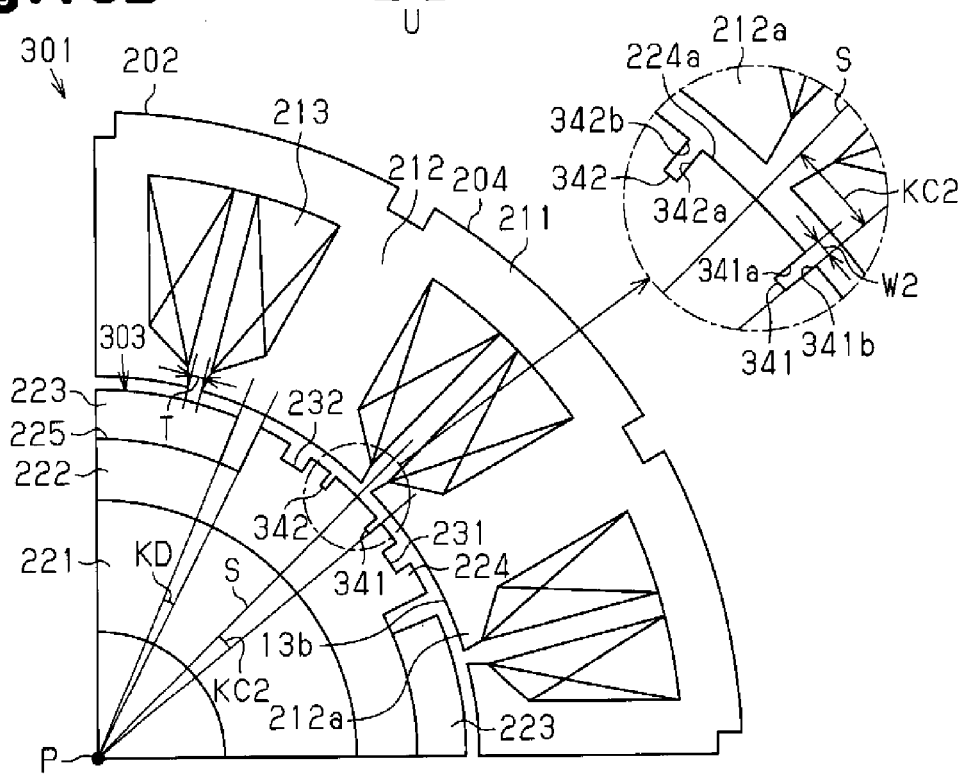

Rotational Angle : R3

Rotational Angle : R1

Rotational Angle : R2

Rotational Angle : R4

Rotational Angle : R5

Rotational Angle : R6

MOTOR

BACKGROUND OF THE INVENTION

The present invention relates to a motor having a rotor of a consequent-pole structure.

For example, Japanese Laid-Open Patent Publication No. 9-327139 discloses a rotor of a consequent-pole structure as a rotor for a motor. The rotor of the above publication includes a rotor core, a plurality of magnets arranged along the circumferential direction of the rotor core, and salient poles integrally formed with the rotor core. Each salient pole is located between a circumferentially adjacent pair of the magnets. The magnets function as either north poles or south poles, and the salient poles function as magnetic poles different from the magnets. While suppressing reduction in the performance, this motor reduces the number of magnets to half of those in a conventional rotor in which all the magnetic poles are formed by magnets. The motor of the publication is therefore advantageous in terms of natural resource and cost saving.

In the meantime, since the rotor of a consequent-pole structure as in the above publication has, in a mixed state, magnets for inducing magnetic flux and salient poles, which do not induce magnetic flux, the rotor is likely to be magnetically imbalanced. As a result, the rotational performance is degraded due to vibrations increased, for example, by the occurrence of cogging torque.

SUMMARY OF THE INVENTION

Accordingly, it is an objective of the present invention to provide a motor that is capable of increasing the output power while keeping the number of magnets in the rotor low.

To achieve the foregoing objective, and in accordance with a first aspect of the present invention, a motor having a rotor and a stator is provided. The rotor includes a rotor core, magnets, and salient poles. The magnets are arranged along the circumferential direction of the rotor core. The magnets function as first magnetic poles. The salient poles are integrally formed with the rotor core, such that each salient pole is located between a circumferentially adjacent pair of the magnets with gaps in between. The salient poles function as second magnetic poles different from the first magnetic poles. The stator has a plurality of teeth that are opposed to the magnets and the salient poles of the rotor in the radial direction and are arranged at equal intervals in the circumferential direction. A first auxiliary groove is formed in a surface of each salient pole that is opposed to the teeth. Each first auxiliary groove has first and second side surfaces facing each other in the circumferential direction. The first side surface is closer to a circumferential center line of the salient pole than the second side surface. The angle from the circumferential center line to the first side surface of each salient pole about the axis of the rotor is represented by KC1. The opening angle between the circumferential ends of the distal end of each tooth about the axis is represented by KA. The opening angle between the circumferential ends of each salient pole about the axis is represented by KB. In this case, the motor is configured such that the following expression is satisfied: $KC1=KA-KB/2$.

In accordance with a second aspect of the present invention, a motor having a rotor and a stator is provided. The rotor includes a rotor core, magnets, and salient poles. The magnets are arranged along the circumferential direction of the rotor core. The magnets function as first magnetic poles. The salient poles are integrally formed with the rotor core, such that each salient pole is located between a circumferentially adjacent pair of the magnets with gaps in between. The salient poles function as second magnetic poles different from the first magnetic poles. The stator has a plurality of teeth that are opposed to the magnets and the salient poles of the rotor in the radial direction and are arranged at equal intervals in the circumferential direction. A second auxiliary groove is formed in a surface of each salient pole that is opposed to the teeth. Each second auxiliary groove has first and second side surfaces located close to a circumferential center line of the salient pole. The first side surface is closer to a circumferential center of the salient pole than the second side surface. The angle from the circumferential center line to the second side surface of each salient pole about the axis of the rotor is represented by KC2. The opening angle between the circumferential ends of the distal end of each tooth about the axis is represented by KA. The opening angle between the circumferential ends of each salient pole about the axis is represented by KB. The opening angle between each magnet and the corresponding salient pole about the axis is represented by KD. In this case, the motor is configured such that the following expression is satisfied: $KC2=KA-KB/2-KD$.

In accordance with a third aspect of the present invention, a motor having a rotor and a stator is provided. The magnets are arranged along the circumferential direction of the rotor core. The magnets function as first magnetic poles. The salient poles are integrally formed with the rotor core, such that each salient pole is located between a circumferentially adjacent pair of the magnets with gaps in between. The salient poles function as second magnetic poles different from the first magnetic poles. The stator has a plurality of teeth that are opposed to the magnets and the salient poles of the rotor in the radial direction and are arranged at equal intervals in the circumferential direction. A tooth auxiliary groove is formed in a surface of each tooth that is opposed to the magnets and the salient poles. Each tooth auxiliary groove has first and second side surfaces located close to a circumferential center line of the tooth. The first side surface is closer to the circumferential center line of the tooth than the second side surface. The first side surface is closer to the circumferential center of the tooth than the second side surface. The angle from the circumferential center line to the second side surface of the tooth auxiliary groove of each tooth about the axis of the rotor is represented by KC3. The opening angle between the circumferential ends of the distal end of each tooth about the axis is represented by KA. The opening angle between the circumferential ends of each salient pole about the axis is represented by KB. The opening angle between each circumferentially adjacent pair of the teeth about the axis is represented by KE. In this case, the motor is configured such that the following expression is satisfied: $KC3=KA/2+KE-KB$.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7A is a plan view of a first lamination member forming the teeth of a motor according to a modified embodiment;

FIG. 7B is a plan view of a second lamination member forming the teeth of the motor according to the modified embodiment;

FIG. 7C is a perspective view illustrating a part of a stator core that is formed by the first and second lamination members shown in FIGS. 7A and 7B;

FIG. 7D is a diagram showing the distal ends of the teeth shown in FIG. 7C;

FIG. 18A is a plan view illustrating the motor of FIG. 14A;

FIG. 18B is a partial plan view showing a part of FIG. 18A;

DESCRIPTION OF THE PREFERRED EMBODIMENTS

A first embodiment of the present invention will now be described with reference to the drawings.

Figure 1A:
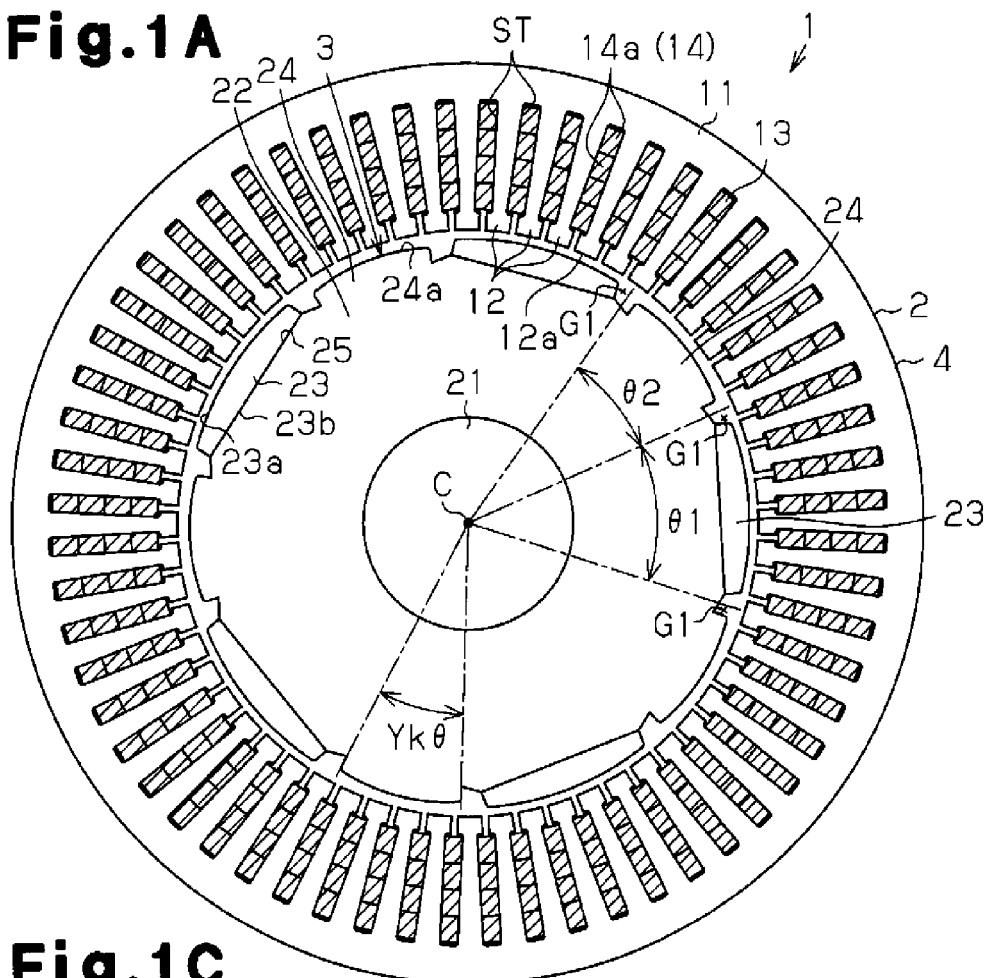
FIG. 1A is a schematic diagram illustrating a motor according to a first embodiment of the present invention.

As shown in FIG. 1A, an inner rotor type motor 1 of the present embodiment includes a substantially annular stator 2 and a rotor 3 arranged radially inward of the stator 2.

Figure 1C:
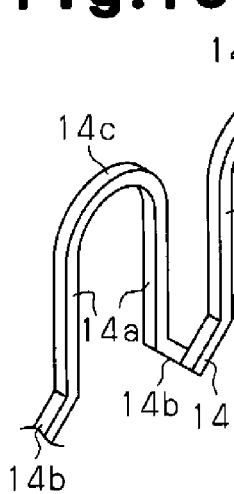
FIG. 1C is a partial perspective view showing a segment conductor of the motor shown in FIG. 1A.
Figure 1B:
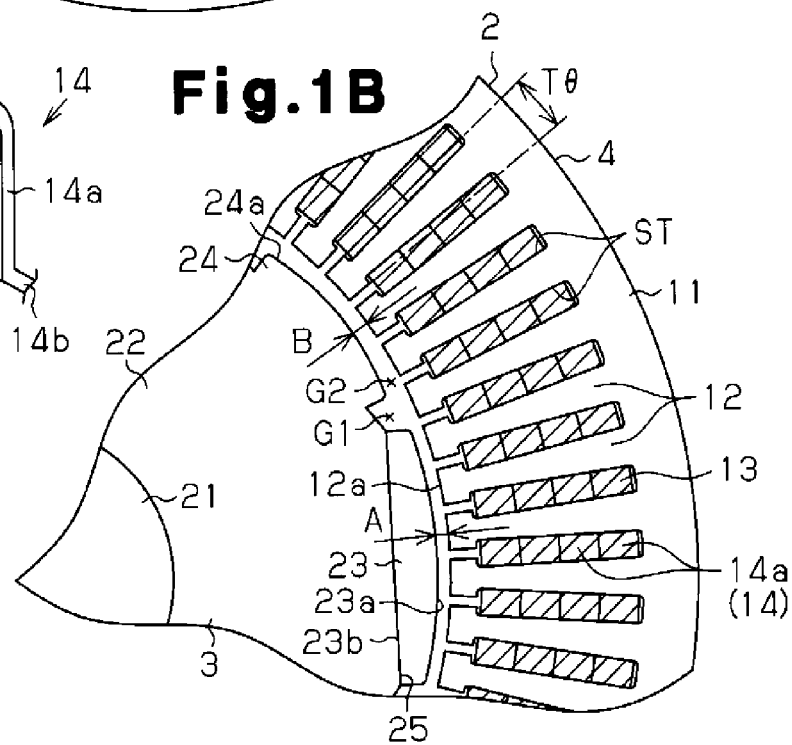
FIG. 1B is a partially enlarged view of FIG. 1A.

The stator 2 includes a stator core 4. As shown in FIGS. 1A and 1B, the stator core 4 has a cylindrical portion 11 and a plurality of teeth 12, the number of which is sixty in the present embodiment. The teeth 12 are arranged along the circumferential direction on the inner circumferential surface of the cylindrical portion 11. The teeth 12 extend radially inward from the inner circumferential surface of the cylindrical portion 11. The stator core 4 is formed by laminating lamination members, which are plate-like members made of high-permeability metal, along the axial direction. A slot ST that extends through the stator 2 along the axial direction is formed between each circumferentially adjacent pair of teeth 12. As viewed along the axial direction, each slot ST has a rectangular cross section extending along the radial direction. The number of the slots ST is the same as the number of the teeth 12 (sixty in the present embodiment). Segment coils 13 are inserted into the slots ST to generate a magnetic field for rotating the rotor 3. Unillustrated insulators are located between the teeth 12 and the segment coils 13.

The segment coils 13 of the stator 2 have rectangular cross section, and are wound around the teeth 12 by distributed winding of multiple phases (three phases in the present embodiment). The segment coils 13 have segment conductors 14 each corresponding to one of the phases. As shown in FIG. 1C, each segment conductor 14 includes a slot insertion portion 14a that is located in the slot ST to extend through the slot ST along the axial direction (direction perpendicular to the sheet of the drawing), a protruding portion 14b forming the slot ST along the axial direction, and a bent portion 14c. Segment conductors 14 that correspond to each phase are electrically connected to each other by welding each radially adjacent pair of slot protruding portions 14b, that is, the ends of the slot insertion portions 14a protruding from the slots ST. The segment conductors 14 for each phase are formed as a lead that is continuous along the circumferential direction. Each segment conductor 14 is formed by bending a conductor plate, and substantially U-shaped. In each segment conductor 14, a pair of the slot insertion portions 14a, which correspond to parallel linear portions, are arranged in two slots ST, between which a plurality of (six) teeth 12 exist.

The rotor 3 includes a substantially annular rotor core 22, a plurality of (five in the present embodiment) magnets 23, and salient poles 24. The rotor core 22 is made of magnetic metal and adhered to the outer circumferential surface of a rotary shaft 21. The magnets 23 are arranged on the outer circumferential surface of the rotor core 22 along the circumferential direction. Each salient pole 24 is located in the outer circumferential portion of the rotor core 22 and between a circumferentially adjacent pair of the magnets 23. The magnets 23 function as north poles. The salient poles 24 are integrally formed with the rotor core 22. The magnets 23 and the salient poles 24 are alternately arranged on the outer circumferential portion of the rotor 3 in the circumferential direction at equal angular intervals. In the present embodiment, each magnet 23 is located at a position opposite to, or 180° away from, one of the salient poles 24. The rotor 3 is a consequent pole type with ten magnetic poles that causes the salient poles 24 to function as south poles in relation to the north pole magnets 23. The number of pole pairs of the rotor 3 is the same as the number of the magnets 23, in which the number of pole pairs is five in the present embodiment. The number of the teeth 12 corresponding to a single segment conductor 14 is determined based on the number obtained by dividing the number of the slots by the number of the magnetic poles (the number of slots/the number of magnetic poles).

The stator 2 of the present embodiment is configured such that, when the number of the magnets 23 (number of pole pairs) of the rotor 3, the number of phases of the segment coils 13, and the number of the teeth 12 are represented by p, m, and L, respectively (where p is an integer greater than one), L=2×p×m×n (where n is a natural number). Based on the expression, the number L of the teeth 12 is set to sixty (L=2×5 (the number of the magnets 23)×3 (the number of phases)×2=60).

The circumferential length of each magnet 23 is slightly greater than that of each salient pole 24. Each magnet 23 is substantially formed as a rectangular prism having a curved outside surface 23a and a flat inside surface 23b. The outside surface 23a of each magnet 23 has an arcuate shape the center of which coincides with an axis P, and is opposed to the distal ends 12a of the corresponding teeth 12 in the radial direction. The inside surface 23b of each magnet 23 is fixed to a fixing surface 25 provided between a circumferentially adjacent pair of the salient poles 24 in the rotor core 22. A first gap G1 exists between each magnet 23 and a circumferentially adjacent salient pole 24. The magnets 23 are configured such that the outside surfaces 23a are located on the same circumference.

Each salient pole 24 has a sectoral cross section in the axial direction, and has an outside surface 24a that bulges outward in the radial direction. That is, the outside surface 24a of each salient pole 24 is curved such that its center in the circumferential direction protrudes relative to both ends. In other words, the outside surface 24a is curved such that it approaches the radially inner end as the distance from the center in the circumferential direction increases toward either end in the circumferential direction. The curvature of all the outside surfaces 24a is the same, and symmetrical with respect to the circumferential center.

The motor 1 of the present embodiment includes the rotor 3 and the stator 2. The rotor 3 is a consequent pole type, which is configured such that the salient poles 24 of the rotor core 22 function as magnetic poles, and the stator 2 has the segment coils 13 formed by the segment conductors 14. Compared to coils formed by winding continuous leads about teeth as in the conventional art, the segment coils 13 have a higher space factor in the slots ST and thus higher output power. Accordingly, since the rotor 3 is a consequent pole type, the number of the magnets 23 can be kept low. The motor 1 is therefore advantageous in terms of natural resource conservation and cost saving. Further, the use of the segment coils 13 as coils of the stator 2 allows the motor 1 to generate high output power.

As shown in FIGS. 1A and 1B, the opening angle Ykθ (see FIG. 1A) of each salient pole 24 about the axis P is set greater than or equal to twice the opening angle Tθ (see FIG. 1B) of the distal end 12a of each tooth 12 about the axis P (in the present embodiment, greater than or equal to four times). That is, the distal ends 12a of multiple teeth 12 are entirely opposed to a single salient pole 24. Therefore, the magnetic flux of each salient pole 24 is allowed to smoothly flow in the radial direction under the influence of the teeth 12 that are opposed to the salient pole 24. This improves the magnetic balance of the rotor 3, improving the rotational performance. Specifically, the torque is improved and the vibration is reduced. The opening angle Ykθ of each salient pole 24 is set to be greater than or equal to a value obtained by multiplying the opening angle Tθ of the distal end 12a of each tooth 12 by a predetermined number. The predetermined number is preferably equal to a number obtained by subtracting one or two from the number of the teeth 12 corresponding to each the segment conductor 14 (six in the present embodiment).

Figure 2A:
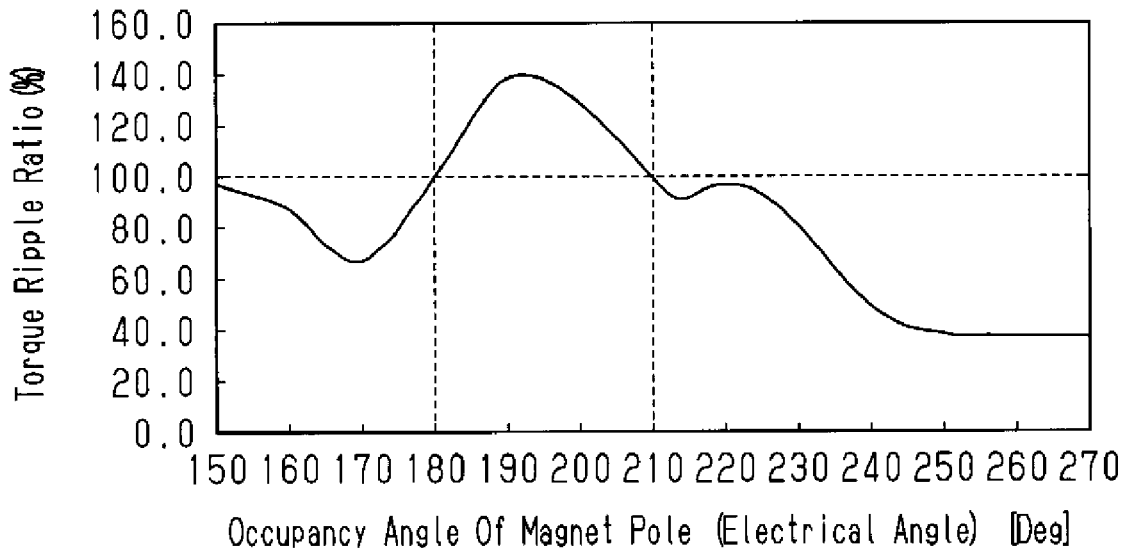
FIG. 2A is a graph showing the relationship between the occupancy angle of the magnet poles in the motor of FIG. 1A and the torque ripple ratio.
Figure 2B:
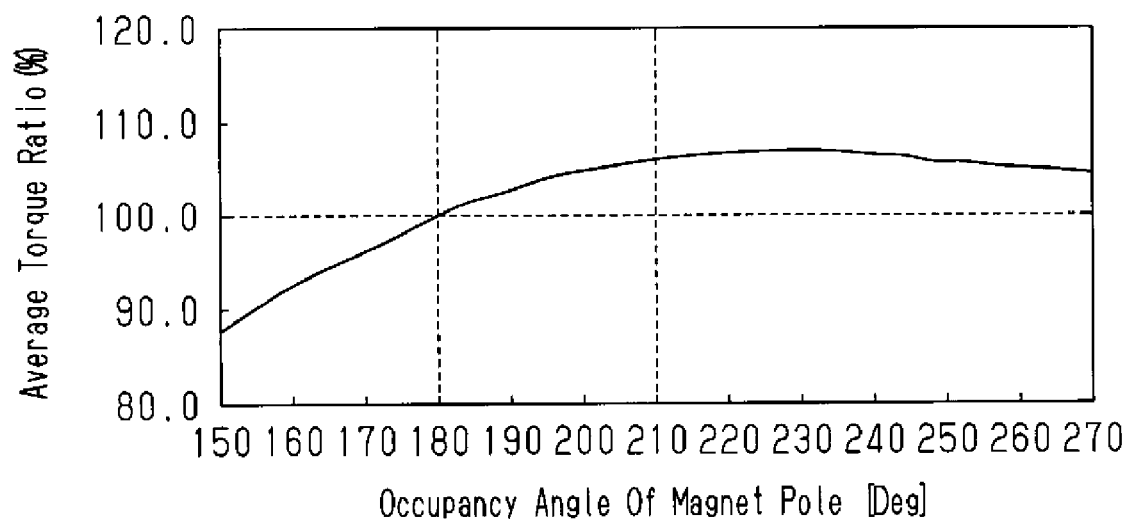
FIG. 2B is a graph showing the relationship between the occupancy angle of the magnet poles in the motor of FIG. 1A and the average torque ratio.

The length of each magnet 23 in the circumferential direction (occupancy angle) is defined as a first magnetic pole occupancy angle (electrical angle) θ1, which ranges from the circumferential midpoint of the first gap G1 between the magnet 23 and one of the circumferentially adjacent salient poles 24 to the circumferential midpoint of the first gap G1 between the magnet 23 and the other circumferentially adjacent salient pole 24. The length of each salient pole 24 in the circumferential direction (occupancy angle) is defined as a second magnetic pole occupancy angle (electrical angle) θ2, which ranges from the circumferential midpoint of the first gap G1 between the salient pole 24 and one of the circumferentially adjacent magnets 23 to the circumferential midpoint of the first gap G1 between the salient pole 24 and the other circumferentially adjacent magnet 23. FIGS. 2A and 2B show the torque ripple ratio and average torque ratio when the first magnetic pole occupancy angle (electric angle) θ1 and the second magnetic pole occupancy angle (electric angle) θ2 are changed, respectively. Since the sum of the magnetic pole occupancy angles θ1 and θ2 of one magnet 23 and one salient pole 24 is an electric angle of 360° (θ1+θ2=360°), only the magnetic pole occupancy angle θ1 will be described below.

FIG. 2A shows the torque ripple ratio when the magnetic pole occupancy angle θ1 of each magnet 23 is changed. If the torque ripple when the magnetic pole occupancy angle θ1 is 180°, that is, when the magnetic pole occupancy angle θ1 of the magnet 23 and the magnetic pole occupancy angle θ2 of the salient pole 24 are structurally the same, is defined as 100%, the torque ripple is less than 100% when the magnetic pole occupancy angle θ1 is in the range of 150° to 180° and in the range of 210° to 270°. In the range of the magnetic pole occupancy angle θ1 between 150° and 180°, the torque ripple is reduced to approximately 60% when the magnetic pole occupancy angle θ1 is approximately 170°. In the range of the magnetic pole occupancy angle θ1 between 210° and 270°, the torque ripple is reduced to the minimum 40% when the magnetic pole occupancy angle θ1 is between 250° and 270°. That is, the ranges in which the magnetic pole occupancy, angle θ1 of each magnet 23 is 150°≦θ1<180° or 210°≦θ1≦270° are preferable ranges in which the torque ripple can be reduced. Further, the range in which the magnetic pole occupancy angle θ1 is 250°≦θ1 270° is a more preferable range in which the torque ripple can be reduced to approximately 40%.

FIG. 2B shows the average torque ratio when the magnetic pole occupancy angle θ1 of each magnet 23 is changed. If the average torque when the magnetic pole occupancy angle θ1 is 180° is defined as 100%, the average torque is greater than 100% when the magnetic pole occupancy angle θ1 is greater than 180° and less than or equal to 270°. When the magnetic pole occupancy angle θ1 is approximately 230°, the average torque is increased to the maximum value, which is approximately 107%. Based on the data of FIGS. 2A and 2B, the range in which the magnetic pole occupancy angle θ1 of the magnets 23 is 210°≦270° is considered to be favorable since the torque ripple is reduced while improving the average torque.

In the rotor 3 of the present embodiment, the magnetic pole occupancy angle θ1 of the magnets 23 is set to a value within the range of 250°≦θ1≦270°, which is within the range of 210°≦θ1≦270°. This increases the average torque and reduces the torque ripple (torque pulsation), thereby improving the rotational performance of the rotor 3.

The outside surfaces 24a and 23a of the salient poles 24 and the magnets 23 of the rotor 3 are arranged such that the outside surfaces 24a of the salient poles 29 are radially inward relative to the outside surfaces 23a of the magnets 23. That is, in a second gap G2 between the stator 2 (the distal ends 12a of the teeth 12) and the rotor 3, a gap distance B corresponding to the salient pole 24 (the shortest gap distance at the circumferential center) is set to be greater than a gap distance A corresponding to the magnet 23 (the shortest gap distance constant at any circumferential position, that is, constant in the circumferential direction).

Figure 3A:
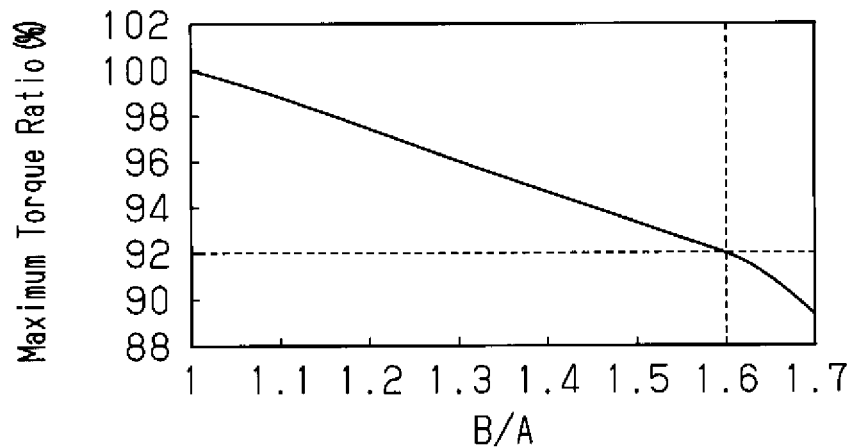
FIG. 3A is a graph showing the relationship between the gap distance ratio B/A and the maximum torque ratio.
Figure 3B:
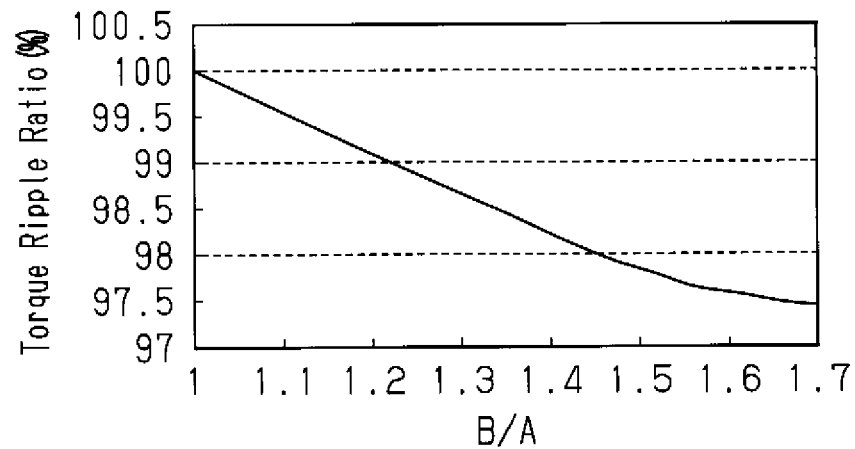
FIG. 3B is a graph showing the relationship between the gap distance ratio B/A and the torque ripple ratio.
Figure 3C:
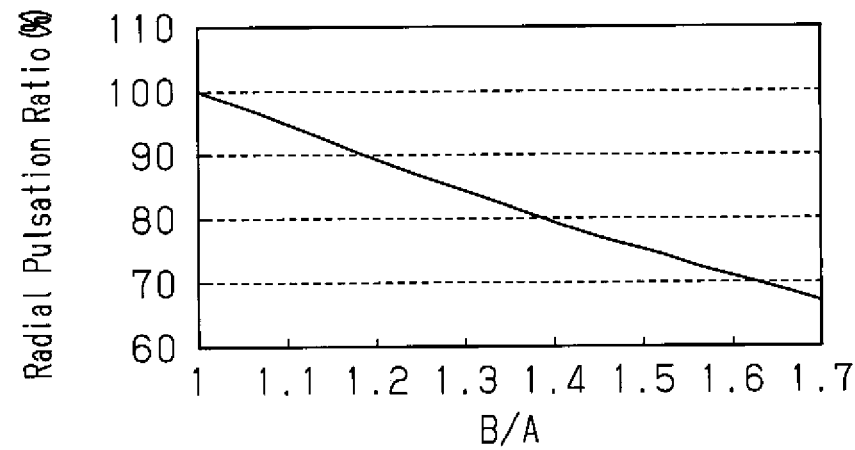
FIG. 3C is a graph showing the relationship between the gap distance ratio B/A and the radial pulsation ratio.

FIGS. 3A, 3B and 3C show the maximum torque ratio, the torque ripple ratio, and the radial pulsation ratio when the ratio B/A of the gap distances B, A is changed, respectively. The torque ripple and the radial pulsation are factors that increase vibrations caused when the rotor 3 rotates.

FIG. 3B shows the torque ripple when B/A is changed. The torque ripple when B/A=1, that is, when the gap distance A and the gap distance B are equal to each other, is defined as 100%. As B/A is increased from one, that is, as the salient pole 24 is moved radially inward compared to the magnet 23, the torque ripple is reduced from 100%. When B/A is in the range from 1 to approximately 1.5, the torque ripple is reduced substantially at a constant rate. When B/A is in the range from approximately 1.5 to 1.7, the torque ripple continues being reduced although the reduction rate is less than the range from 1 to approximately 1.5. Specifically, the torque ripple is reduced so as to be approximately 99% when B/A=1.2, approximately 98.2% when B/A=1.4, and approximately 97.5% when B/A=1.6. That is, if 1<B/A, the torque ripple is expected to be reduced.

FIG. 3C shows the radial pulsation ratio when B/A is changed. As in the above case, the radial pulsation when B/A=1 is defined as 100%. As B/A is increased from one, the radial pulsation is reduced from 100% substantially at a constant rate. Specifically, the radial pulsation is reduced so as to be approximately 89% when B/A=1.2, approximately 80% when B/A=1.4, and approximately 72% when B/A=1.6. That is, if 1<B/A, the radial pulsation is expected to be reduced.

FIG. 3A shows the maximum torque ratio when B/A is changed. As in the above cases, the maximum torque ratio when B/A=1 is defined as 100%. As B/A is increased from 1, the maximum torque is reduced from 100%. In the range in which 1<B/A≦1.6, the maximum torque is reduced substantially at a constant rate. When B/A=1.6, the maximum torque is approximately 92%. When B/A exceeds 1.6, the reduction rate of the maximum torque is greater than that in the range of 1<B/A≦1.6. That is, the range of 1<B/A≦1.6 is a preferable range in which the reduction rate of the maximum torque is relatively small, and the reduction of the maximum torque is suppressed to or below 10%.

Taking the above factors into consideration, the ratio B/A between the gap distance B of each salient pole 24 relative to the stator 2 and the gap distance A of each magnet 23 is set to a value in the range of 1<B/A≦1.6 in the rotor 3 of the present embodiment. Accordingly, while minimizing the reduction in the maximum torque, it is possible to reduce the torque ripple (FIG. 3B) and the radial pulsation (FIG. 3C), which lead to vibrations during rotation of the rotor 3.

As described above, factors of vibrations during rotation of the rotor 3 are reduced, so that the rotational performance of the rotor 3 is improved.

The present embodiment provides the following advantages.
 (1) In the present embodiment, the opening angle Ykθ of each salient pole 24 opposed to the distal ends 12a of teeth 12 is greater than or equal to twice the opening angle Tθ of the distal end 12a of each tooth 12. Therefore, the magnetic flux of each salient pole 24 is allowed to smoothly flow in the radial direction under the influence of two or more the teeth 12 that are opposed to the salient pole 24. As a result, the magnetic balance of the rotor 3 is improved, and the rotational performance is improved. Specifically, the torque is improved and the vibration is reduced.
 (2) The motor 1 of the present embodiment has the rotor 3 of a consequent-pole structure, which includes the salient poles 24 integrally formed with the rotor core 22. Each salient pole 24 is located at the outer circumference of the rotor core 22 and between an adjacent pair of the magnets 23. The salient poles 24 function as magnetic poles. The stator 2 has slots ST that extends through the stator 2 along the axial direction. Each slot ST is formed between each an pair of the teeth 12. The segment conductors 14, which have the slot insertion portions 14a arranged in the slots ST, correspond to each phase, and are electrically connected to each other by welding the ends of the slot insertion portions 14a protruding from the slots ST, so that the segment coils 13 of multiphase are formed. Compared to coils formed by winding a continuous lead about teeth as in the conventional art, the segment coils 13 have a higher space factor in the slot ST, and the output power of the motor 1 is increased. Accordingly, since the rotor 3 is a consequent pole type, the number of the magnets 23 can be kept low. The motor 1 is therefore advantageous in terms of the natural resource and cost saving. Further, the use of the segment coils 13 as coils of the stator 2 allows the motor 1 to generate high output power.

(3) The magnetic pole occupancy angle $\theta 1$ of each magnet 23 and the magnetic pole occupancy angle $\theta 2$ of each salient pole 24 are determined with reference to the circumferential midpoint of the first gap G1 between a magnet 23 and a circumferentially adjacent salient pole 24 ($\theta 1+\theta 2=360°$). The magnetic pole occupancy angle $\theta 1$ of each magnet 23 is set to a value in the range of $210°\leqq\theta 1\leqq 270°$. Therefore, compared to a case in which $\theta 1=180°$, that is, a common structure is employed in which the magnetic pole occupancy angles $\theta 1$ and $\theta 2$ of each magnet 23 and each salient pole 24 are structurally the same, the torque ripple can be reduced while increasing the average toque (see FIGS. 2A and 2B). This improves the rotational performance of the rotor 3.

If the magnetic pole occupancy angle $\theta 1$ is set to any value in the range of $150°\leqq\theta 1<180°$, the torque ripple is reduced compared to a case where the magnetic pole occupancy angle $\theta 1$ is set to 180° (see FIG. 2A), and the rotation performance of the rotor 3 is improved.

(4) In the second gap G2 between the stator 2 and the rotor 3 of the present embodiment, the ratio B/A between the shortest gap distance A, which corresponds to the magnets 23, and the shortest gap distance B, which corresponds to the salient poles 24 is set to an appropriate value that satisfies 1<B/A. This reduces the torque ripple and the radial pulsation, which are causes of vibration when the rotor 3 rotates (see FIGS. 3B and 3C), thereby improving the rotational performance of the rotor 3.

(5) In the present embodiment, the ratio B/A between the shortest gap distance A, which corresponds to each magnet 23, and the shortest gap distance B, which corresponds to each salient pole 24, is set to a value within the range of $1<B/A\leqq 1.6$. This reduces the torque ripple and the radial pulsation, which are causes of vibration when the rotor 3 rotates (see FIGS. 3A to 3C), while minimizing reduction in the torque, thereby improving the rotational performance of the rotor 3.

(6) In the present embodiment, the number of the magnets 23 and the number of the salient poles 24 are both an odd number, and each magnet 23 is at a position opposite to, or 180° away from, one of the salient poles 24. That is, in a configuration in which each magnet 23 is at a position opposite to, or 180° away from, one of the salient poles 24, magnetic imbalance is likely to occur and the vibration during rotation of the rotor 3 is likely to increase. Thus, the optimization of the occupancy angles of the salient poles 24 and the magnets 23 and the optimization of the ratio B/A of the gap distances are effective in reducing the vibration during rotation of the rotor 3.

The above described first embodiment may be modified as follows.

The shape of the stator 2 of the above described first embodiment may be changed as necessary. For example, in a modification shown in FIGS. 4, 5A, and 5B, a continuous portion 31 and a gap 32 are formed between the distal ends 12a of each circumferentially adjacent pair of the teeth 12 in the stator core 4. More specifically, as shown in FIGS. 5A and 5B, the stator core 4 is formed by laminating a plurality of lamination members E in the axial direction. That is, each lamination member E includes a part that is laminated to form the cylindrical portion 11 and a part that is laminated to form the teeth 12 (hereinafter, referred to as the teeth 12 of the lamination member E). To facilitate the illustration, only four of the lamination members E are shown in FIGS. 4, 5A and 5B.

In each lamination member E, a continuous portion 31 is formed between the distal ends 12a of each circumferentially adjacent tooth 12 to connect the teeth 12 together. A recess 33 is formed by pressing both sides of each continuous portion 31 of each lamination member E. That is, each continuous portion 31 of the lamination members E has a thickness in the axial direction that is smaller than the thickness of the teeth 12 in the axial direction by the amount of the recesses 33. When the lamination members E are laminated in the axial direction, the continuous portions 31 and the gap 32 are alternately formed along the axial direction between the distal ends 12a of the teeth 12.

Figure 4:
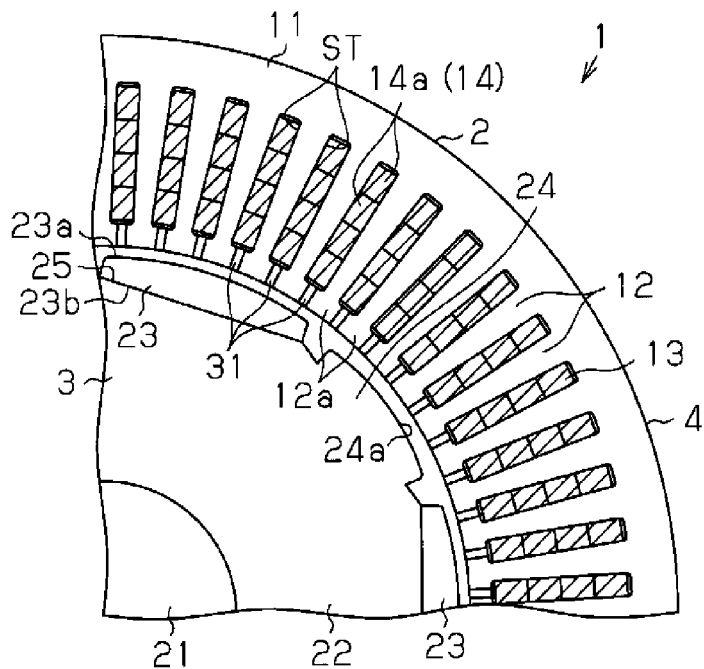
FIG. 4 is a plan view illustrating a part of a motor according to a modified embodiment.
Figure 5A:
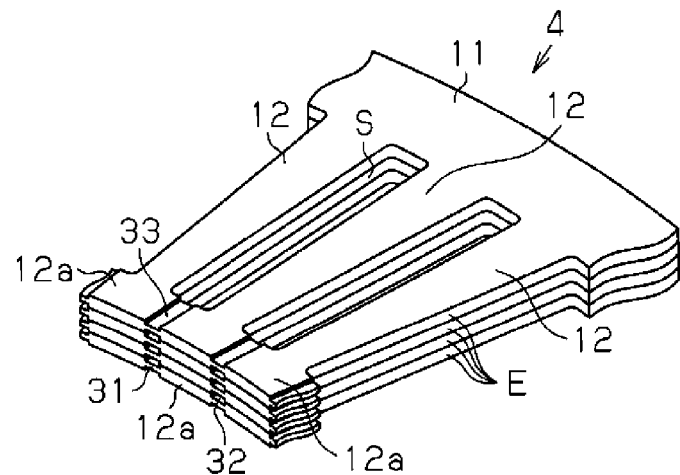
FIG. 5A is a perspective view showing a part of the stator core of the motor shown in FIG. 4.
Figure 5B:
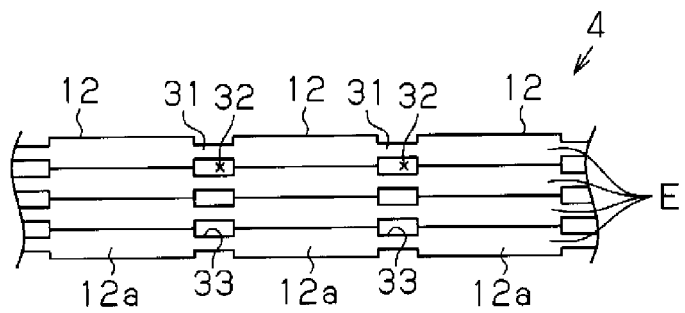
FIG. 5B is a diagram showing the distal ends of the teeth shown in FIG. 5A.
Figure 6A:
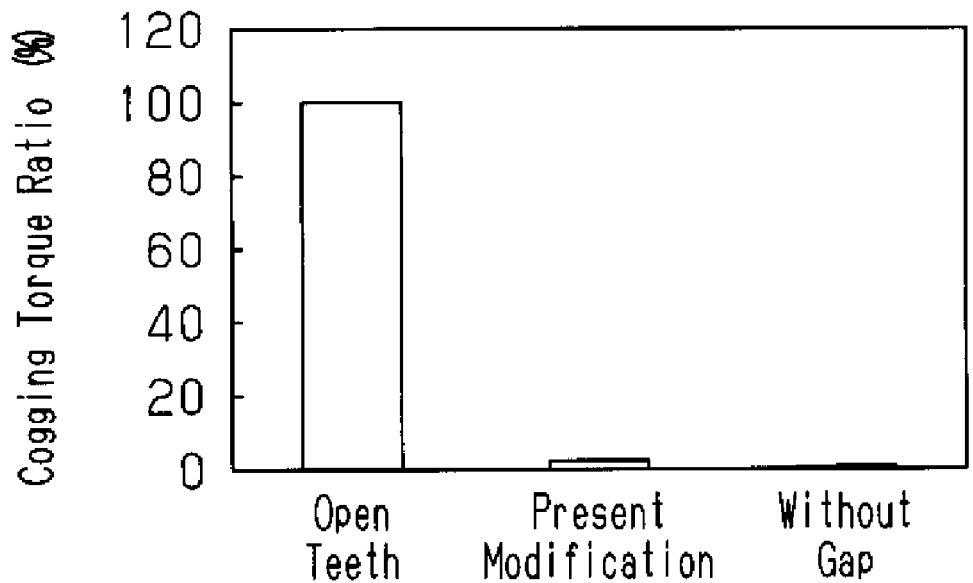
FIGS. 6A and 6B are graphs showing the characteristics of a motor according to a modified embodiment.
Figure 6B:
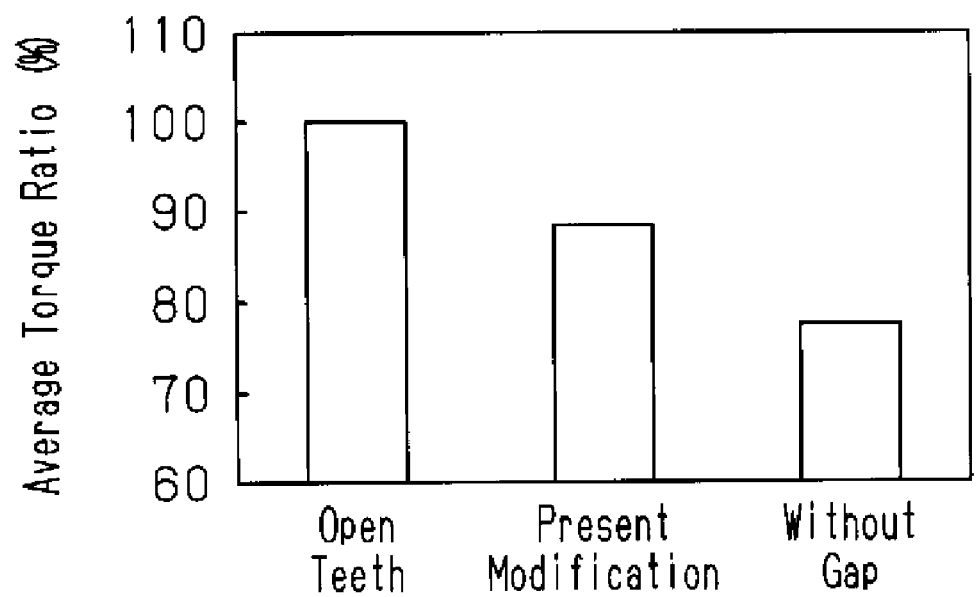

FIGS. 6A and 6B show graphs showing the cogging torque and the average torque in the motor having the stator shown in FIGS. 4, 5A and 5B, a motor 1 that does not have the continuous portions 31 as in the stator 2 of the previous embodiment (a motor indicated by "open teeth" in FIGS. 6A and 6B), and a motor 1 having a stator with no gaps 32. In FIGS. 6A and 6B, the cogging torque and the average torque of the motor 1 having no continuous portions 31 are defined as 100%.

As shown in FIG. 6A, the motor 1 of the configuration shown in FIGS. 5A and 5B reduces the cogging torque to 1 to 5% relative to the motor 1 having a stator with no continuous portions 31. The motor 1 having a stator without gaps 32 also reduces the cogging torque. As shown in FIG. 68, the average torque of the motor 1 of the present modification is less than that of the motor 1 having a stator without continuous portion 31, but 1.5 times greater than that of the motor having a stator without gaps.

According to the configuration of the present modification, the continuous portions 31 suppress abrupt changes in the magnetic flux density, and as a result, the cogging torque is reduced. Further, while reducing the cogging torque, the gaps 32 hinder the flow of flux between the distal ends 12a of the teeth 12. Thus, leakage flux is reduced, so that the reduction in the torque is suppressed. This improves the rotation performance of the rotor 3. Also, the continuous portions 31 at the distal ends 12a of the teeth 12 improve the rigidity of the core of the stator 2.

In the example shown in FIGS. 5A and 5B, the recesses 33 recessed in the axial direction by pressing are formed in the continuous portions 31 between the distal ends 12a of the teeth 12 of each lamination member E. The recesses 33 form the gaps 32. Therefore, the residual stress of the pressing performed on the continuous portions 31 of the lamination member E and the recesses 33 (the gaps 32) formed by the pressing hinders the flow of flux through the distal ends 12a of the teeth 12. This reduces the leakage flux, and suppresses the reduction in the torque.

In the example shown in FIGS. 5A and 5B, the gaps 32 are formed by forming the recesses 33 in the continuous portions 31 of the lamination members E. However, the gaps 32 may be formed by other methods.

For example, in the example shown in FIGS. 7A to 7D, the stator core 4 is formed by alternately laminating first lamination member E1 and second lamination member E2 in the axial direction. Each first lamination member E1 and each second lamination member E2 have parts that are laminated to form the cylindrical portion 11 and parts that are laminated to form the teeth 12. In FIGS. 7A and 7B, the cylindrical portion 11 and the teeth 12 of the first and second lamination members E1, E2 have the same reference numerals as those formed by lamination. To facilitate the illustration, only two of the first and second lamination members E1, E2 are shown in FIGS. 7C and 7D.

As shown in FIG. 7A, a gap 42 is formed between the distal ends 12a of each adjacent pair of teeth 12 of the first lamination member E1. In contrast, as shown in FIG. 7B, a continuous portion 41 is formed between the distal ends 12a of each adjacent pair of the teeth 12 of the second lamination member E2. Each continuous portion 41 connects adjacent pair of the teeth 12. When the first lamination members E1 and the second lamination members E2 are laminated in the axial direction, the continuous portions 41 and the gaps 42 are alternately formed along the axial direction between the distal ends 12a of the teeth 12.

This configuration provides substantially the same advantages as the example shown in FIGS. 5A and 5B. In addition, in the example shown in FIGS. 7A to 7D, the first lamination members E1 and the second lamination members E2 are alternately laminated in the axial direction, the inter-teeth continuous portions 41 and the gaps 42 are easily formed between the distal ends 12a of each adjacent pair of the teeth 12.

Figure 8A:
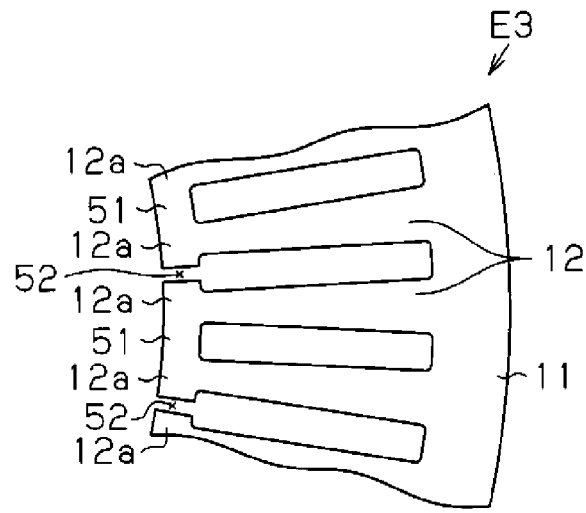
FIG. 8A is a plan view of a lamination member forming the teeth of a motor according to a modified embodiment.
Figure 8B:
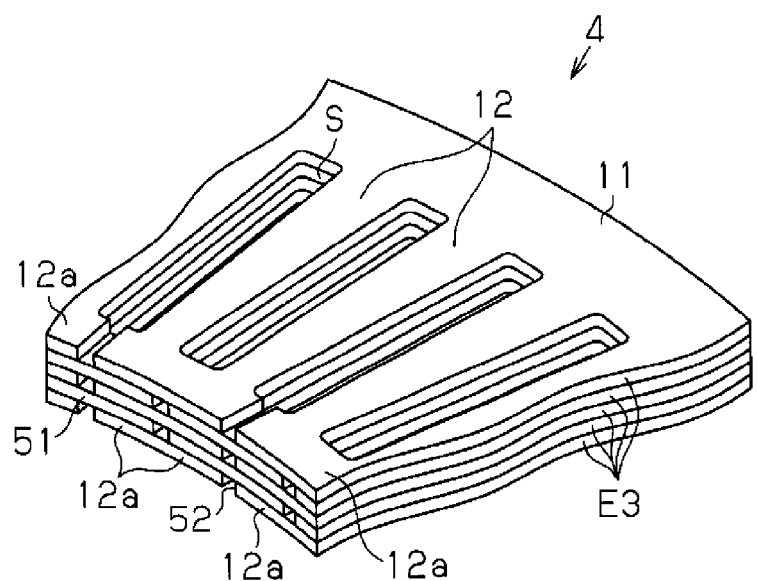
FIG. 8B is a perspective view illustrating a part of a stator core that is formed by the lamination members shown in FIG. 7A.
Figure 8C:
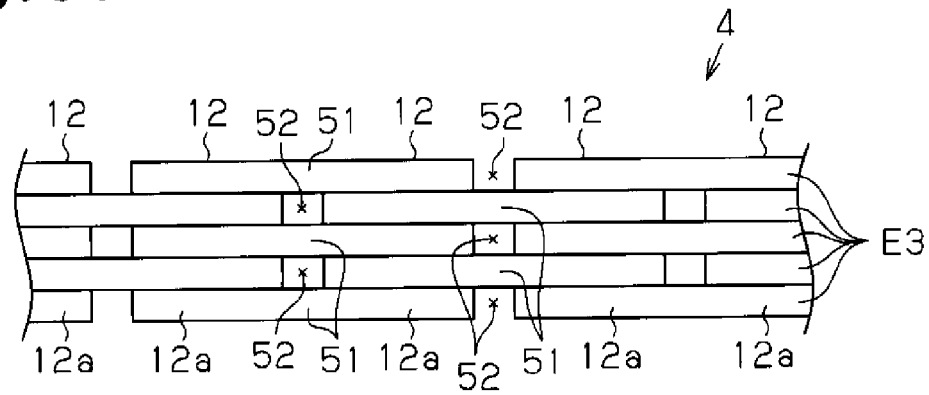
FIG. 8C is a diagram showing the distal ends of the teeth shown in FIG. 8B.

Further, in the example shown in FIGS. 8A, 8B, and 8C, the stator core 4 is formed by laminating a plurality of lamination members E3 in the axial direction. That is, each lamination member E3 includes a part that is laminated to form the cylindrical portion 11 and a part that is laminated to form the teeth 12. In FIG. 8A, the cylindrical portion 11 and the teeth 12 of the lamination members E3 have the same reference numerals as those formed by lamination. To facilitate the illustration, only five of the lamination members 23 are shown in FIGS. 8B and 8C.

As shown in FIG. 8A, continuous portions 51 and gaps 52 are alternately formed along the circumferential direction between the distal ends 12a of the teeth 12 of the third lamination member E3. The lamination members E3 are laminated such that the continuous portions 51 and the gaps 52 are alternately arranged in the axial direction. In other words, the lamination members E3 that are adjacent to each other in the axial direction are laminated while being displaced in the circumferential direction by the amount of a single tooth 12. Accordingly, the continuous portions 51 and the gaps 52 are alternately arranged in the axial direction between the distal ends 12a of adjacent teeth 12.

This configuration provides substantially the same advantages as the example shown in FIGS. 5A and 5B. In addition, in the example shown in FIGS. 8A to 8C, the lamination members E3 having the identical structure are used to form the continuous portions 51 and the gaps 52 between the distal ends 12a of the teeth 12. This facilitates the parts control and reduces costs.

The shape of the salient poles 24 of the rotor core 22 of the above described first embodiment may be changed as necessary.

Figure 9A:
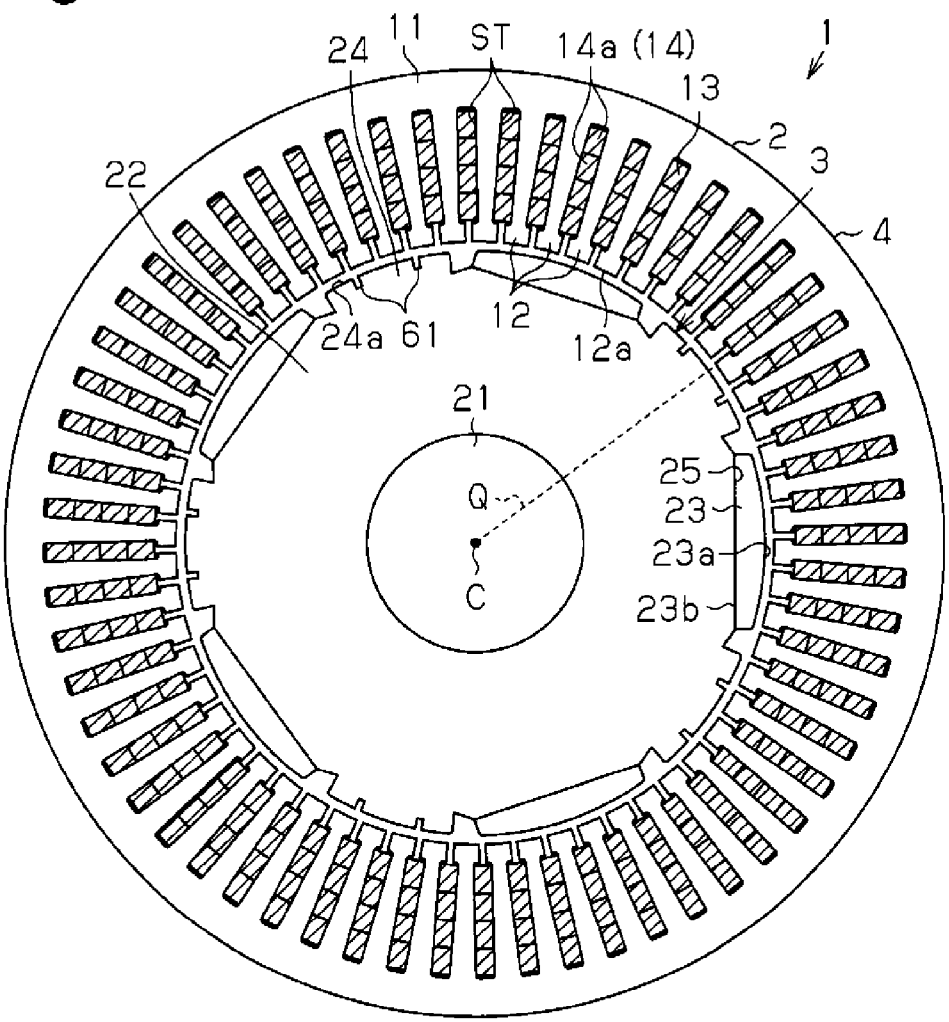
FIG. 9A is a schematic diagram illustrating a motor according to a modified embodiment.
Figure 9B:
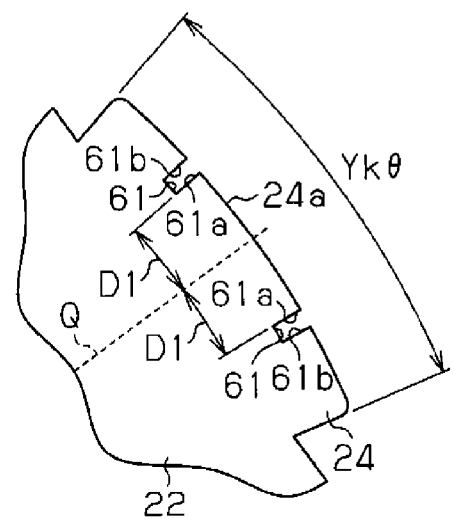
FIG. 9B is an enlarged view of a salient pole of FIG. 9A.

For example, in the example of FIGS. 9A and 9B, a pair of first auxiliary grooves 61 is formed in the outside surface 24a of each salient pole 24, which is opposed to teeth 12. The first auxiliary grooves 61 are at symmetrical positions with respect to the circumferential center line Q of the salient pole 24. The first auxiliary grooves 61 have the same shape, and each have a pair of side surfaces 61a, 61b opposed to each other in the circumferential direction. Of the side surfaces of each first auxiliary groove 61, the side surface located inside with respect to the circumferential direction (the one closer to the circumferential center line Q) is defined as the side surface 61a, and the side surface located outside with respect to the circumferential direction (the one closer to a circumferential end of the salient pole 24) is defined as the side surface 61b. The first auxiliary groove 61 extends linearly along the axial direction.

Figure 10:
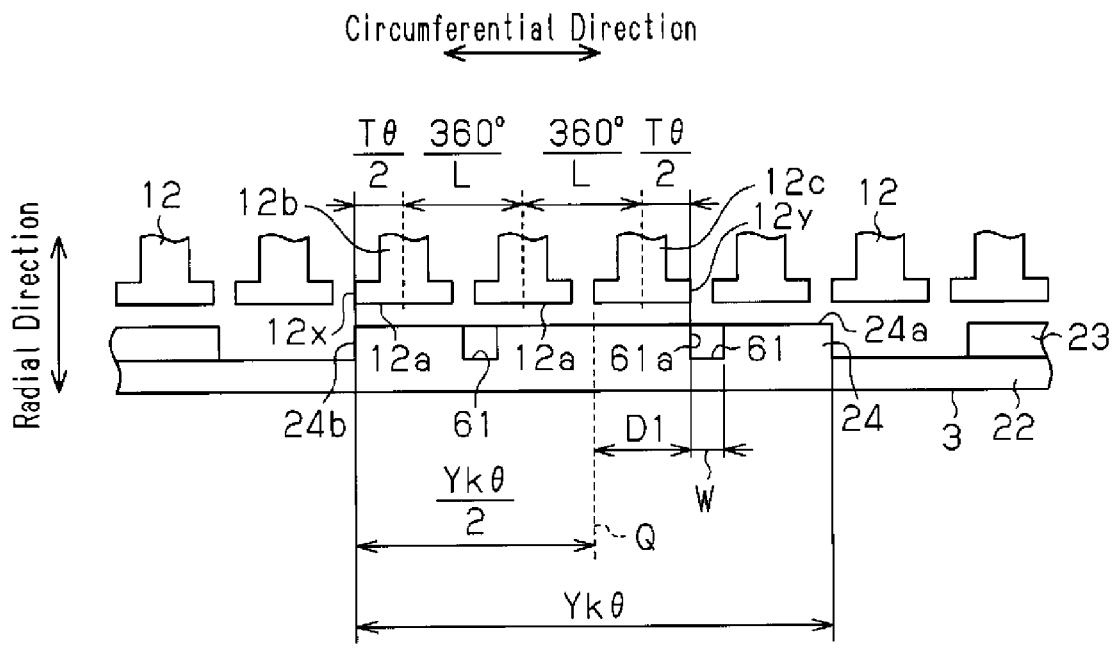
FIG. 10 is a diagram showing the relationship between the salient poles and the teeth in the motor shown in FIG. 9A.

As shown in FIG. 10, when the opening degree of the salient pole 24 about the axis P is defined as $Yk\theta(°)$, the opening degree of the distal end 12a of the tooth 12 about the axis P is defined as $T\theta(°)$, and the number of the teeth is represented by L, the positional angle D1 of the first auxiliary groove 61 (the angle D1 from the circumferential center Q of the salient pole 24 to the side surface 61a of the first auxiliary groove 61) is determined to satisfy the expression $D1=T\theta+(a-1)\times360(°)/L-Yk\theta/2$ (where a is a natural number). $360(°)/L$ in the expression indicates the angle between the circumferential centers of circumferentially adjacent teeth 12 about the axis P. That is, the right side of the expression $T\theta+(a-1)\times360(°)/L$ indicates the opening degree of circumferentially consecutive teeth 12 the number of which is represented by a. Therefore, when the configuration satisfies the expression, the angle from a circumferential end 24b of the salient pole 24 (left end as viewed in FIG. 10) to the side surface 61a of a first auxiliary groove 61 that is farther from the end 24b, that is, $Yk\theta/2+D1$ is equal to the angle between the circumferential ends of circumferentially consecutive teeth 12 the number of which is represented by a. FIG. 10 shows a configuration in which a=3.

That is, in this configuration, as shown in FIG. 10, when the circumferential end 24b of the salient pole 24 is aligned in the radial direction with a first end 12x (left end) of the distal end 12a of any tooth 12 (a tooth 12b in FIG. 10), the side surface 61a of the first auxiliary groove 61 is aligned in the radial direction with a circumferential second end 12y (right end) of a tooth 12 that is an ath tooth (a tooth 12c in FIG. 10) from the tooth 12b along the circumferential direction (rightward). "Being aligned in the radial direction" indicates a state in which a circumferential end of the salient pole 24 and a circumferential end of the tooth 12b are located on the same straight line extending along the radial direction.

Figure 11:
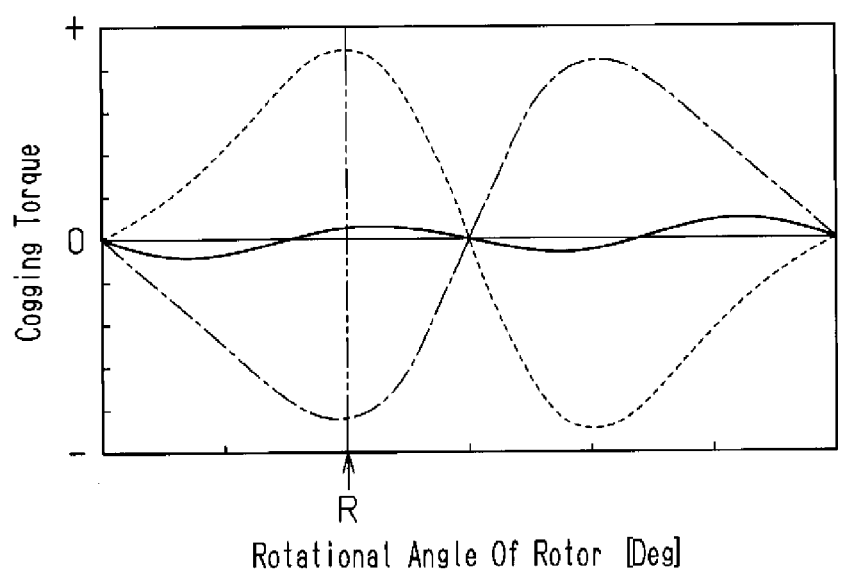
FIG. 11 is a graph showing the relationship between the rotational angle of the rotor and the cogging torque in the motor shown in FIG. 9A.

FIG. 11 shows the waveform of the cogging torque when the rotor 3 is rotating. The waveform represented by the alternate long-and-short dashed line in FIG. 11 is the waveform of the main component of the cogging torque (the cogging torque waveform of a configuration in which no first auxiliary grooves 61 are formed in any salient poles 24), and the waveform represented by the broken line is the waveform of the cogging torque generated by the first auxiliary grooves 61. The waveform represented by the solid line is the waveform of the cogging torque generated in the motor 1 of the configuration shown in FIGS. 9 and 10, and is a composite waveform of the main component of the cogging torque (the waveform represented by the alternate long-and-short dashed line) and the cogging torque waveform generated by the first auxiliary grooves 61 (the waveform represented by the broken line).

The rotational angle R of the rotor 3 in FIG. 11 is the rotational angle of the rotor 3 in the state shown in FIG. 10. At the rotational angle R, the circumferential end 24b of the salient pole 24 and the circumferential first end 12x of the tooth 12b are aligned with each other in the radial direction. Thus, flux tends to be concentrated in radially aligned sections. As a result, the main component of the cogging torque has the negative peak value. At this time, the side surface 61a of the first auxiliary groove 61 and the circumferential second end 12y of the tooth 12c are aligned with each other. Thus, flux tends to be concentrated in the radially aligned sections. As a result, the cogging torque generated by the first auxiliary groove 61 has a positive peak value. The peak of the main component of the cogging torque and the peak of the cogging torque generated by the first auxiliary groove 61, which appear at the rotation angle R, have opposite phases and substantially the same magnitude. The cogging torques therefore cancel each other (see the waveform of the solid line in FIG. 11). Accordingly, the cogging torque generated when the rotor 3 is rotating is reduced.

According to this configuration, the first auxiliary grooves 61 formed in the outside surface 24*a* (surface) of each salient pole 24 that is opposed to some of the teeth 12 optimizes the flow of flux in the salient pole 24, thereby reducing the cogging torque. Also, since the expression D1=Tθ+(a−1)×360(°)/L−Ykθ/2 is satisfied, the cogging torque generated in the first auxiliary grooves 61 of each salient pole 24 serves as a cancelling component that reduces the cogging torque generated at the circumferential end 24*b* of the salient pole 24. The cogging torque generated in the entire motor 1 can be reduced, and the rotation performance of the rotor 3 is therefore improved. Also, since the first auxiliary grooves 61 are formed to correspond to both circumferential ends of the salient pole 24, the cogging torque is further reduced.

Figure 12:
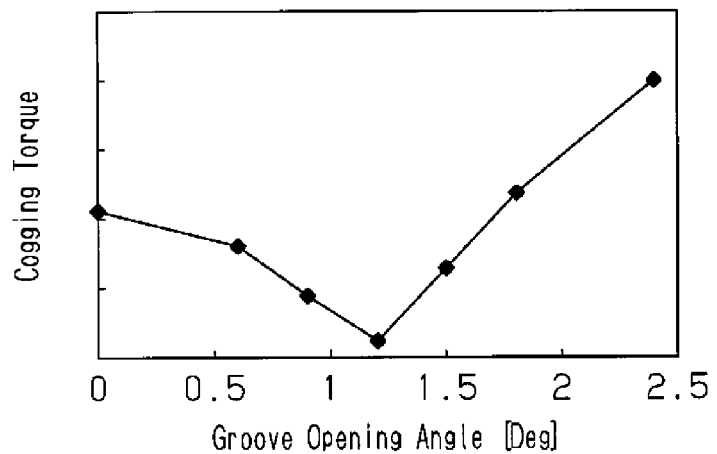
FIG. 12 is a graph showing the relationship between the cogging torque and the groove opening angle of first auxiliary grooves formed in each salient pole shown in FIG. 9A.

FIG. 12 shows the magnitude of the cogging torque when the groove opening degree W of the first auxiliary grooves 61 is changed. As shown in FIG. 12, as the groove opening degree W is increased from zero degrees, the cogging torque decreases. When the groove opening degree W is approximately 1.2 degrees, the cogging torque is the smallest.

Figure 13:
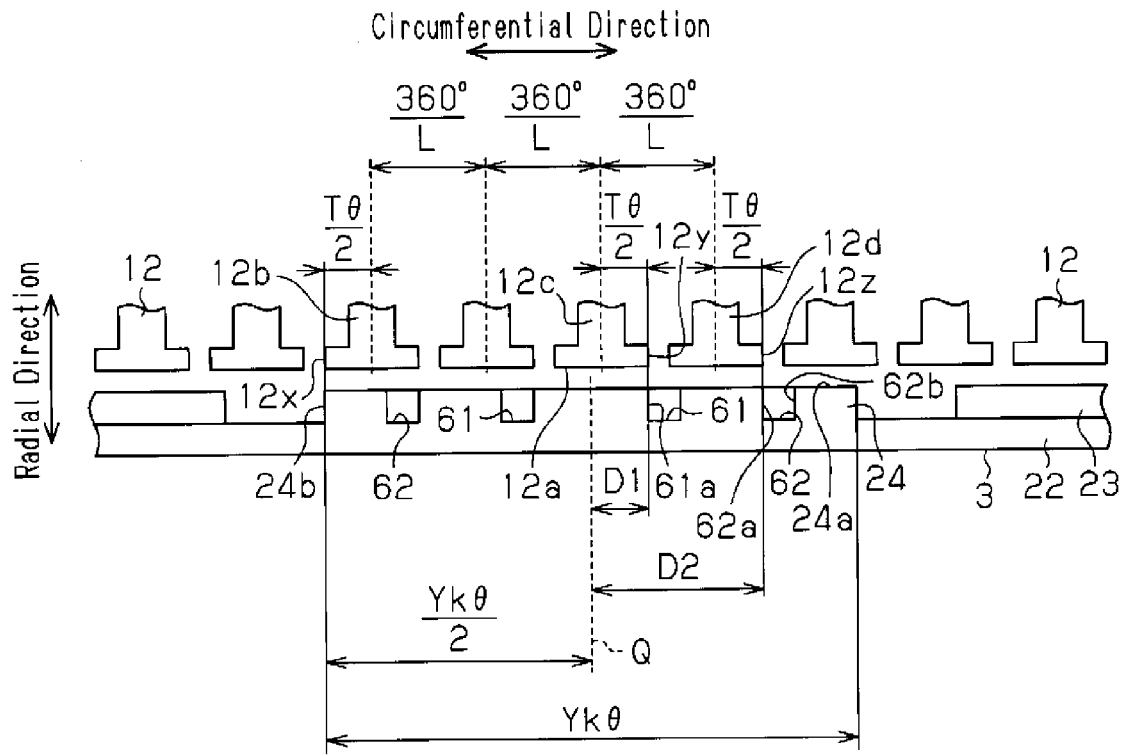
FIG. 13 is a diagram showing the relationship between the salient poles and teeth according to a modified embodiment.

In addition to the configuration shown in FIGS. 9A, 9B and 10, second auxiliary grooves 62 shown in FIG. 13 may be provided separately from the first auxiliary grooves 61. Like the first auxiliary grooves 61, a pair of second auxiliary grooves 62 is formed at symmetrical positions with respect to the circumferential centerline Q of each salient pole 24. The second auxiliary grooves 62 have the same shape, and each have a pair of side surfaces 62*a*, 62*b* opposed to each other in the circumferential direction. Of the side surfaces of each second auxiliary groove 62, the side surface located inside with respect to the circumferential direction (the one closer to the circumferential center line Q) is defined as the side surface 62*a*, and the side surface located outside with respect to the circumferential direction (the one closer to a circumferential end of the salient pole 24) is defined as the side surface 62*b*. The second auxiliary groove 62 extends linearly along the axial direction.

The positional angle D2 of each second auxiliary groove 62 (the angle D2 from the circumferential center Q of the salient pole 24 to the side surface 62*a* of the second auxiliary groove 62) is determined to satisfy the expression D2=D1+360(°). Accordingly, the positional angle D2 of the second auxiliary grooves 62 is determined such that the angle from the circumferential end 24*b* of the salient pole 24 to the side surface 62*a* of a second auxiliary groove 62 that is farther from the end 24*b* (that is, Ykθ/2+D1) is equal to the angle between the circumferential ends of circumferentially consecutive teeth 12 the number of which is represented by a+1. FIG. 13 shows a configuration in which a=3.

That is, in this configuration, when the circumferential end 24*b* of each salient pole 24 is aligned in the radial direction with the first end 12*x* of the distal end 12*a* of any tooth 12*b*, the side surface 61*a* of the first auxiliary groove 61 is aligned in the radial direction with a circumferential second end 12*y* of a tooth 12*c* that is an ath tooth from the tooth 12*b* along the circumferential direction (rightward). Also, the side surface 62*a* of the second auxiliary groove 62 is aligned in the radial direction with a circumferential second end 12*z* of a tooth 12*d* that is an (a+1)th tooth from the tooth 12*b* along the circumferential direction (rightward).

According to this configuration, not only the cogging torque generated in the first auxiliary grooves 61, but also the cogging torque generated in the second auxiliary grooves 62 serves as a cancelling component that reduces the cogging torque generated at the circumferential end 24*b* of the salient pole 24. The cogging torque generated in the entire motor 1 is therefore further reduced.

In the first embodiment, the number of the magnets 23 and the number of the salient poles 24 are five each, so that the rotor 3 has ten magnetic poles. However, other configurations may be employed. That is, the number of the magnets 23 and the number of the salient poles 24 may be changed as necessary.

In the first embodiment, the shapes of the outside surfaces 23*a* and 24*a* of the magnets 23 and the salient poles 24 may be changed as necessary. In the first embodiment, the outside surfaces 23*a* of the magnets 23 are arcuate and arranged on the same circle, and the outside surface 24*a* of each salient pole 24 has a greater curvature than that of the outside surface 23*a*. Also, the outside surfaces 23*a*, 24*a* may be curved and located on the same circle. Further, the outside surfaces 23*a*, 24*a* may be curved to have a large curvature. The curvature of the outside surfaces 23*a*, 24*a* does not need to be constant, but may be changed along the circumferential direction or changed linearly. Other than these modifications, the shape of the magnets 23 and the shape of the rotor core 22 including the salient poles 24 may be changed as necessarily.

A second embodiment of the present invention will now be described with reference to the drawings.

Figure 14A:
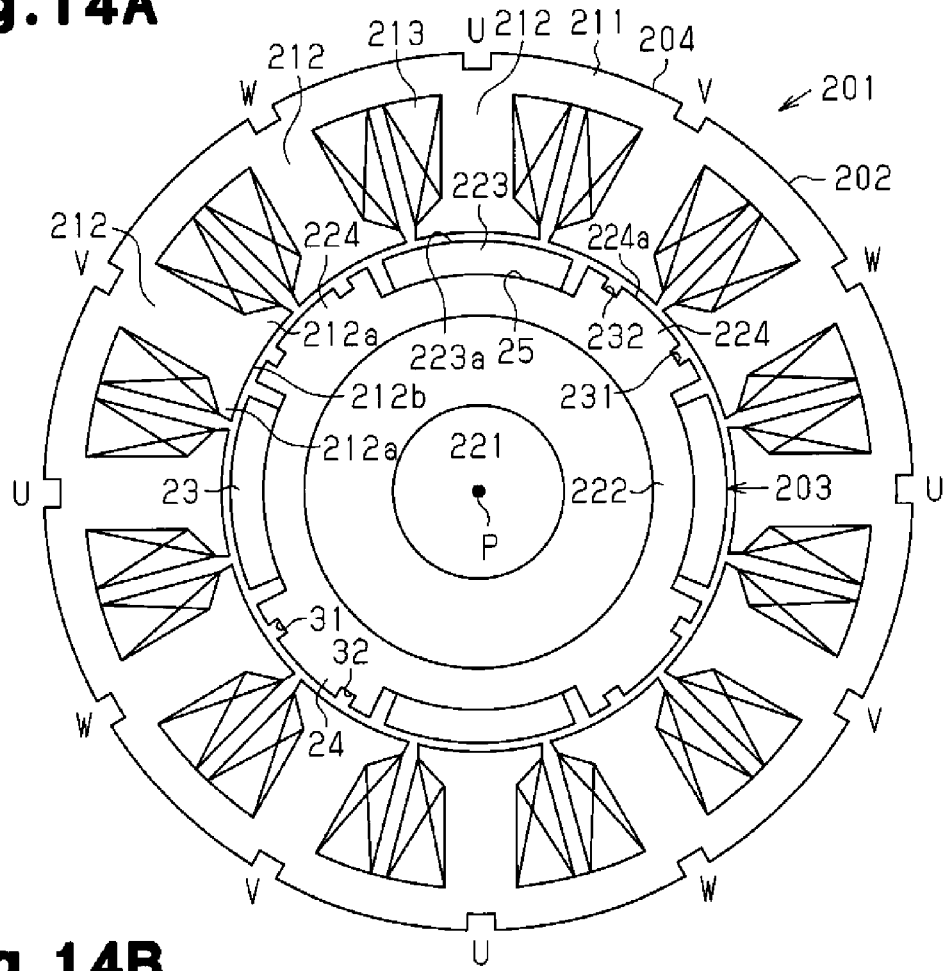
FIG. 14A is a plan view illustrating a motor according to a second embodiment of the present invention.

As shown in FIG. 14A, an inner rotor type motor 201 of the present embodiment includes a substantially annular stator 202 and a rotor 203 arranged radially inward of the stator 202.

The stator 202 includes a stator core 204. The stator core 204 has a cylindrical portion 211 and a plurality of teeth 212, the number of which is twelve in the present embodiment. The teeth 212 are arranged along the circumferential direction on the inner circumferential surface of the cylindrical portion 211. The teeth 212 extend radially inward from the inner circumferential surface of the cylindrical portion 211. The teeth 212 are formed at equal angular intervals in the circumferential direction. Coils 213 of the U-phase, V-phase, and W-phase are sequentially wound about the teeth 212 by concentrated winding. Each tooth 212 has at its distal end a pair of protruding portions 212*a* protruding in the circumferential direction. The surface 212*b* (the inside surface in the radial direction) of each tooth 212 is formed to be arcuate the center of which coincides with the axis P of the motor 201. The surface 212*b* of each tooth 212 is formed from one of the protruding portion 212*a* to the other protruding portion 212*a*. The tooth 212 is formed to be symmetrical with respect to the center line in the circumferential direction.

The rotor 203 includes a substantially annular rotor core 222, a plurality of (four in the present embodiment) magnets 223, and salient poles 224. The rotor core 222 is made of magnetic metal and adhered to the outer circumferential surface of a rotary shaft 221. The magnets 223 are arranged on the outer circumferential surface of the rotor core 222 along the circumferential direction. Each salient pole 224 is located in the outer circumferential portion of the rotor core 222 and between a circumferentially adjacent pair of the magnets 223. The magnets 223 function as north poles. The salient poles 224 are integrally formed with the rotor core 222. That is, the magnets 223 and the salient poles 224 are alternately arranged on the outer circumferential portion of the rotor 203 in the circumferential direction at equal angular intervals. The rotor 203 is a consequent pole type with eight magnetic poles that causes the salient poles 224 to function as south poles in relation to the north pole magnets 223. The number of the magnetic poles (eight magnetic poles) of the rotor 203 is 2/3 of the number (twelve) of the teeth 212, and the ratio of the number of the magnetic poles of the rotor 203 and the number of the teeth 212 is 2:3.

The outside surface 223a of each magnet 223 has an arcuate shape the center of which coincides with the axis P, and is opposed to the surface 212b of the corresponding tooth 212 in the radial direction. The circumferential length of each magnet 223 is slightly greater than that of each salient pole 224. The inside surface 223b of each magnet 223 is fixed to a fixing surface 225 provided between a circumferentially adjacent pair of the salient poles 224 in the rotor core 222. A gap exists between each magnet 223 and a circumferentially adjacent salient pole 224. The magnets 223 are configured such that the outside surfaces 223a are located on the same circumference.

Each salient pole 224 has a sectoral cross section in the axial direction, and has an outside surface 224a (outside surface in the radial direction) that bulges outward in the radial direction. A pair of auxiliary grooves 231, 232 (both are first auxiliary grooves) is formed in the outside surface 224a of each salient pole 224. The auxiliary grooves 231, 232 are at symmetrical positions with respect to the circumferential center line S of the salient pole 240. The auxiliary grooves 231, 232 have the same shape, and have a pair of side surfaces 231a, 231b and a pair of side surfaces 232a, 232b opposed to each other in the circumferential direction, respectively. The side surfaces of the auxiliary grooves 231, 232 located inside with respect to the circumferential direction (the ones closer to the circumferential center line S) are defined as the side surfaces 231a, 232a, and the side surfaces located outside with respect to the circumferential direction (the ones closer to the circumferential ends of the salient pole 224) are defined as the side surfaces 231b, 232b.

Figure 14B:
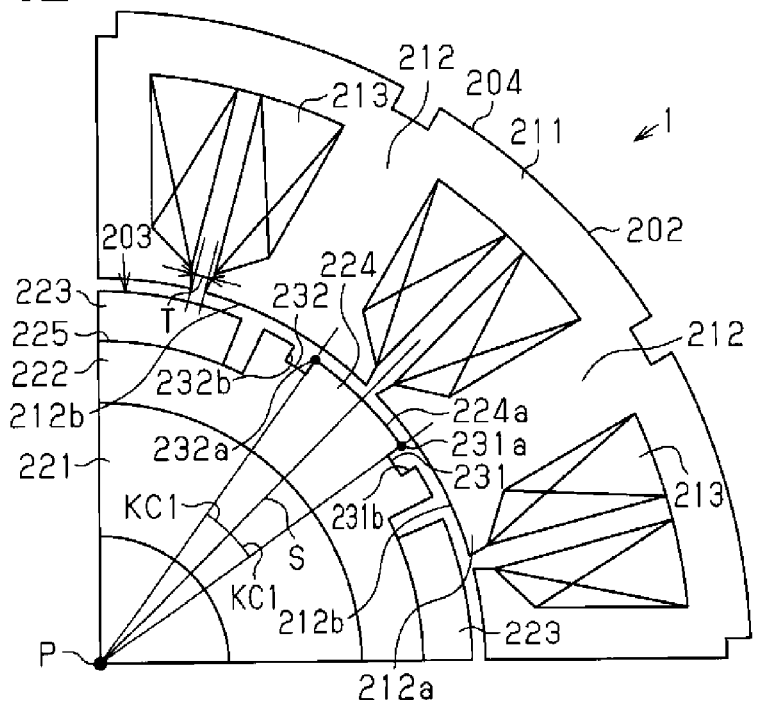
FIG. 14B is a partial plan view showing a part of FIG. 14A.

The auxiliary grooves 231, 232 extend linearly along the axial direction. The depth of the auxiliary grooves 231, 232 is set to be 1/3 of the radial dimension of the salient poles 224. As described above, the auxiliary grooves 231, 232 are at symmetrical positions with respect to the circumferential center line S of the salient pole 224. Thus, the angle from the circumferential center line S to the inner side surface 231a of the auxiliary groove 231 about the axis P and the angle from the circumferential center line S to the inner side surface 232a of the auxiliary groove 232 about the axis P are equal to each other. Hereinafter, this angle is referred to as a positional angle KC1 of the auxiliary grooves 231, 232 (see FIG. 14B).

Figure 15A:
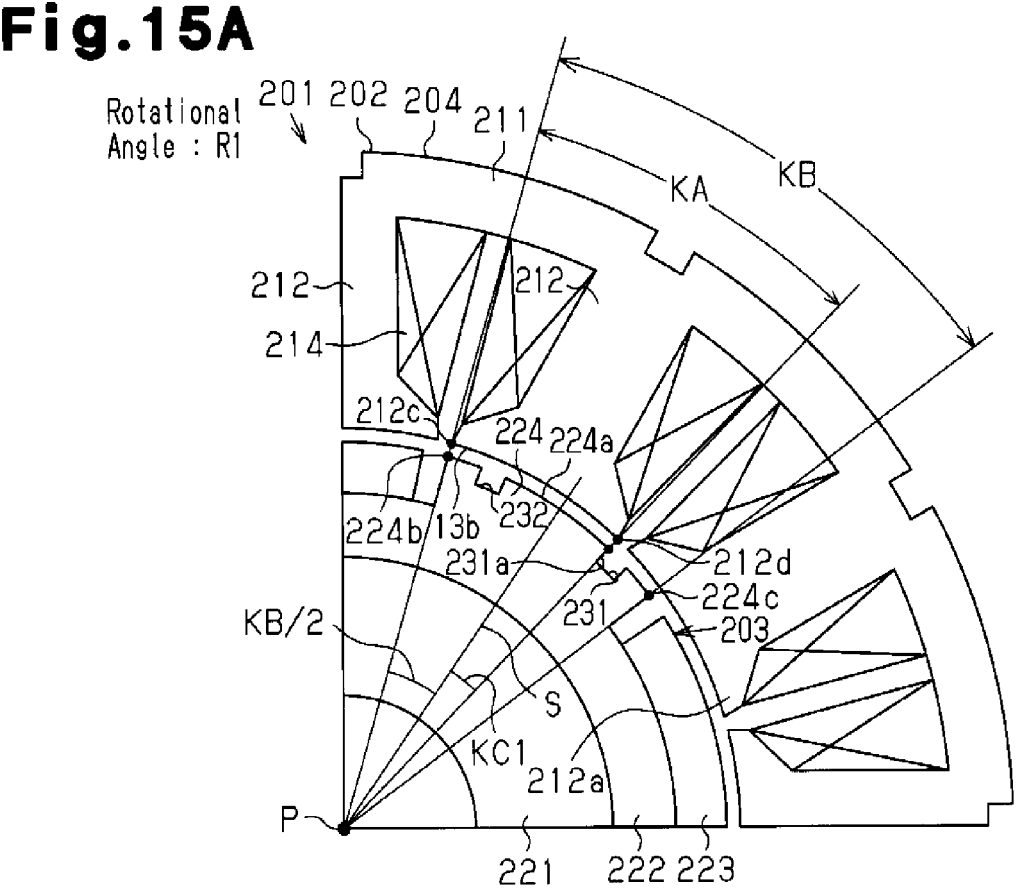
FIG. 15A is a partial plan view showing a state in which the rotor of the motor shown in FIG. 14 is at a rotational angle R1.
Figure 15B:
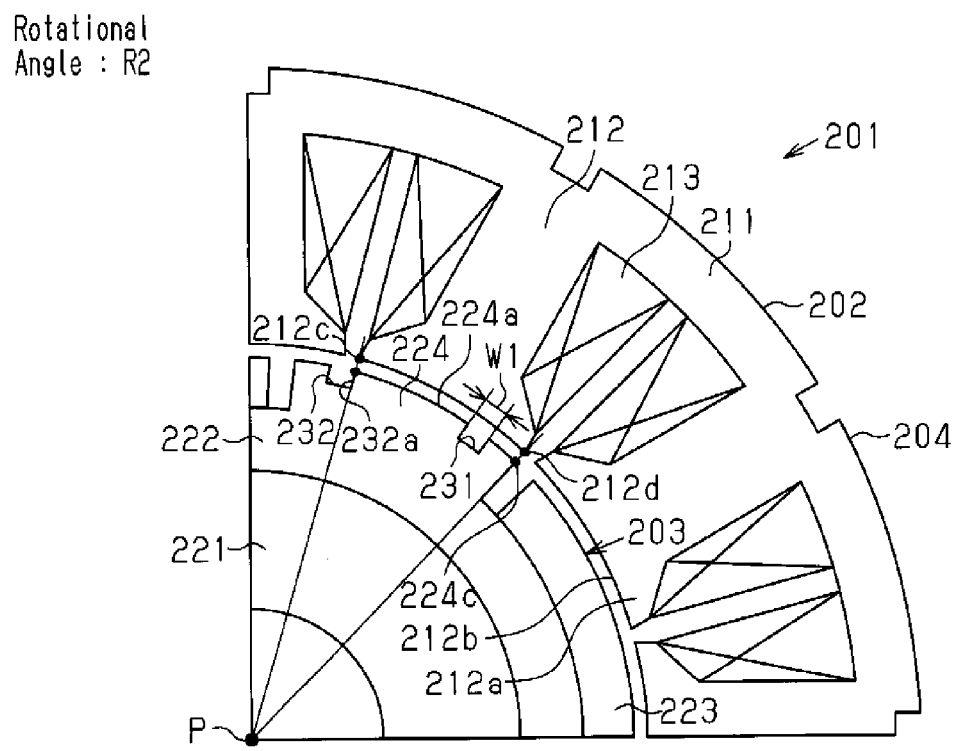
FIG. 15B is a partial plan view showing a state in which the rotor of the motor shown in FIG. 14 is at a rotational angle R2.

As shown in FIG. 15A, the opening angle KA between circumferential ends 212c and 212d of the surface 212b of each tooth 212 about the axis P is set to be smaller than the opening angle KB between circumferential ends 224b and 224c of each salient pole 224 about the axis P. The positional angle KC1 of the auxiliary grooves 231, 232 is set to satisfy the expression KC1=KA−KB/2. Accordingly, in a state where a tooth 212 is opposed to a salient pole 224 in the radial direction as shown in FIG. 15A, when the circumferential first end 212c of the surface 212b of the tooth 212 is aligned in the radial direction with the circumferential first end 224b of the salient pole 224 (specifically, a part at which the circumferential side surface of the salient pole 224 and the outside surface 224a in the radial direction intersect), the circumferential second end 212d of the surface 212b of the tooth 212 is aligned in the radial direction with the side surface 231a of the auxiliary groove 231 (specifically, a part at which the side surface 231a and the outer side surface 240a of the salient pole 224 intersect). Likewise, when the circumferential second end 212d of the surface 212b of the tooth 212 is aligned in the radial direction with the circumferential second end 224c of the salient pole 224 as shown in FIG. 15B, the circumferential first end 212c of the surface 212b of the tooth 212 is aligned in the radial direction with the side surface 232a of the auxiliary groove 232. "Being aligned in the radial direction" indicates a state in which the circumferential ends 224b, 224c of the salient pole 224 and the circumferential ends 212c, 212d of the tooth 212 are located on the same straight line extending along the radial direction.

Figure 16:
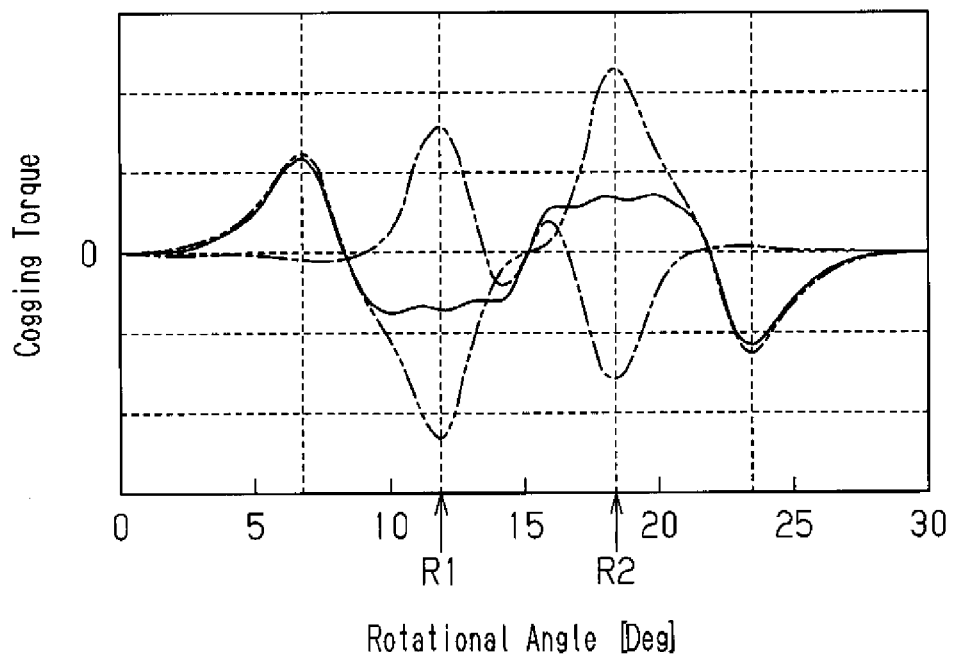
FIG. 16 is a graph showing the relationship between the rotational angle of the rotor and the cogging torque in the motor shown in FIG. 14A.

FIG. 16 shows the waveform of the cogging torque when the rotor 203 is rotating. The waveform represented by the alternate long-and-two-short dashed line in FIG. 16 is the waveform of the main component of the cogging torque, and is the same as the waveform of the cogging torque in a rotor having no auxiliary grooves 231, 232 in the salient poles 224. The waveform represented by an alternate long-and-short dashed line is the waveform of the cogging torque generated by the auxiliary grooves 231, 232. The waveform represented by the solid line is the waveform of the cogging torque generated in the motor 201 of the present embodiment, and is a composite waveform of the main component of the cogging torque (the waveform represented by the alternate long-and-two-short dashed line) and the cogging torque waveform generated by the first auxiliary grooves 231, 232 (the waveform represented by the alternate long-and-short dashed line).

FIG. 16 shows the cogging torque generated at the rotational angle R1 of the rotor 203 shown in FIG. 15A, that is, when the circumferential first end 224b of each salient pole 224 is aligned in the radial direction with the circumferential first end 212c of the corresponding tooth 212. At the rotation angle R1, the circumferential first end 224b of each salient pole 224 and the circumferential first end 212c of the corresponding tooth 212 are aligned with each other in the radial direction. Thus, magnetic flux is likely to be concentrated in a part close to the circumferential first end 212c of the tooth 212. As a result, the main component of the cogging torque is increased, the main component of the cogging torque (the waveform represented by the alternate long-and-two-short dashed line).

In the motor 201 of the present embodiment, the positional angle KC1 of the auxiliary grooves 231, 232 is set to satisfy the expression KC1=KA−KB/2. Thus, the circumferential second end 212d of each tooth 212 is aligned in the radial direction with the side surface 231a of the auxiliary groove 231 at the rotational angle R1. Therefore, the flux at the time is easily dispersed in the vicinity of the circumferential second end 212d of each tooth 212, and is less likely to be concentrated in the vicinity of the circumferential first end 212c of the tooth 212. As shown in FIG. 16, the cogging torque generated by the auxiliary grooves 231, 232 has at the rotational angle R1 a peak of the opposite phase (positive) to the cogging torque, and therefore serves as a component cancelling the main component of the cogging torque. The peak is generated by the auxiliary groove 231. Therefore, the cogging torque of the entire motor 201 (the waveform indicated by solid line), which is the composite of the main component of the cogging torque and the cogging torque generated by the auxiliary grooves 231, 232, has a waveform in which the peak of the main component of the cogging torque at the rotational angle R1 is reduced. As described above, the cogging torque generated can be reduced by the auxiliary groove 231, and the rotation performance of the rotor 3 is improved. The absolute value of the peak of the cogging torque generated by the auxiliary grooves 231, 232 is less than the absolute value of the peak of the main component of the cogging torque.

The other auxiliary groove 232 operates in the same manner as the auxiliary groove 231. Specifically, in a state where each salient pole 224 is opposed to a tooth 212 as shown in FIG. 15B, when the circumferential second end 224c of the salient pole 224 is aligned in the radial direction with the circumferential second end 212d of the tooth 212 (the rotational angle R2 in FIG. 15B), the circumferential first end 212c of the tooth 212 is aligned in the radial direction with the side surface 232a of the auxiliary groove 232. Thus, as in the case of the auxiliary groove 231 described above, the cogging torque generated by the auxiliary grooves 231, 232 functions as a component cancelling the peak of the opposite phase of the main component of the cogging torque at the rotational angle R2, that is, the main component of the cogging torque. This further reduces the cogging torque, and the rotation performance of the rotor 203 is improved.

Figure 17:
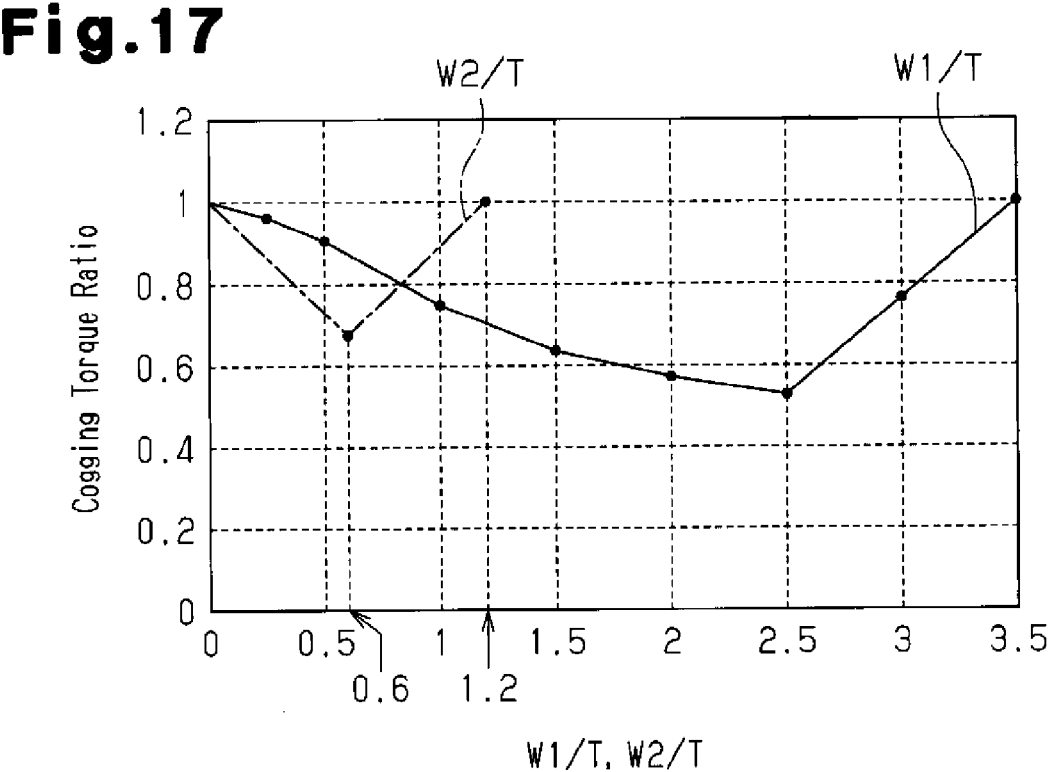
FIG. 17 is a graph showing the relationship of W1/T and W2/T with the cogging torque ratio.

The graph of the solid line in FIG. 17 shows the cogging torque ratio when the ratio W1/T is changed, in which W1 represents the circumferential width of the auxiliary grooves 231, 232 (see FIG. 15B) with reference to the side surfaces 231a, 232a located inside of the auxiliary grooves 231, 232 (closer to the circumferential center line S), and T represents the circumferential interval T between the distal ends of adjacent teeth 212 (see FIG. 15B), or between the protruding portions 212a. In FIG. 17, if the cogging torque when W1/T=0, that is, when there are no auxiliary grooves 231, 232, is defined as 1, the cogging torque decreases from W1/T=0 to W1/T=2.5. The cogging torque has the minimum value of 0.5 when W1/T=2.5. In the range from W1/T=2.5 to W1/T=3.5, the cogging torque increases from the minimum value, but remains less than 1. That is, the cogging torque is less than 1 in the range of 0<W1/T<3.5. Thus, if W1/T is set to a value in this range, the cogging torque is expected to become lower than that in the case where no auxiliary grooves 231, 232 are formed. If W1/T=2.5, the cogging torque is reduced to the half. That is, the cogging torque is most significantly reduced.

The present embodiment provides the following advantages.

(7) In the present embodiment, the auxiliary grooves 231, 232 are formed in the outside surface 224a of each salient pole 224 of the rotor 203, and the positional angle KC1 the auxiliary grooves 231, 232 satisfies the expression KC1=KA−KB/2. Therefore, when each tooth 212 is opposed to a salient pole 224 in the radial direction, and the circumferential first end 212c of the surface 212b of the tooth 212 is aligned in the radial direction with the circumferential first end 224b of the salient pole 224 while the rotor 203 is rotating, the circumferential second end 212d of the tooth 212 is aligned in the radial direction with the side surface 231a of the auxiliary groove 231. Also, when each tooth 212 is opposed to a salient pole 224 in the radial direction, and the circumferential second end 212d of the surface 212b of the tooth 212 is aligned in the radial direction with the circumferential second end 224c of the salient pole 224 while the rotor 203 is rotating, the circumferential first end 212c of the tooth 212 is aligned in the radial direction with the side surface 232a of the auxiliary groove 232. At this time the cogging torque generated in the vicinity of the circumferential first and second ends 212c, 212d of the tooth 212 that are aligned with the side surfaces 231a, 232a of the auxiliary grooves 231, 232 (the cogging torque generated by the auxiliary grooves 231, 232) serves as a component cancelling the cogging torque (main component) generated in the vicinity of the circumferential ends 212c, 212d of the tooth 212 that is aligned in the radial direction with the circumferential first and second ends 224b, 224c of the salient pole 224. Thus, it is possible to reduce the cogging torque generated by the entire motor 201, so as to improve the rotation performance of the rotor 203.

(8) In the present embodiment, the auxiliary grooves 231, 232 are formed in a pair along the circumferential direction to be symmetrical with respect to the circumferential center line S in each salient pole 224. Since the auxiliary grooves 231, 232 are formed in a pair to correspond to the circumferential first and second ends 224b, 224c of each salient pole 224, respectively, the cogging torque is further reduced.

(9) In the present embodiment, the ratio W1/T between the circumferential width W1 of the auxiliary grooves 231, 232 and the interval T between circumferentially adjacent teeth 212 is set to satisfy the expression 0<W1/T<3.5. This enables further reduction in the cogging torque (see FIG. 4), and improves the rotation performance of the rotor 203.

A third embodiment of the present invention will now be described with reference to the drawings.

As shown in FIGS. 18A and 18B, in addition to the configuration of the second embodiment, a motor 301 of the present embodiment has inside auxiliary grooves 331, 332, which serve as second auxiliary grooves and are formed in the outside surface 224a of each salient pole 224. Like or the same reference numerals are given to those components that are like or the same as the corresponding components of the second embodiment, and the detailed description thereof will be omitted.

The inside auxiliary grooves 341, 342 are formed at positions located inside with respect to the circumferential direction of the auxiliary grooves 231, 232 (first auxiliary grooves), and symmetrical with respect to the circumferential center line S of the salient pole 224. The inside auxiliary grooves 341, 342 have the same shape, and have a pair of side surfaces 341a, 341b and a pair of side surfaces 342a, 342b opposed to each other in the circumferential direction, respectively. The side surfaces located inside (the ones closer to the circumferential center line S) are defined as first side surfaces 341a, 342a, and the side surfaces located outside (the ones closer to the circumferential ends of the salient pole 224) are defined as second side surfaces 341b, 342b.

Like the outside auxiliary grooves 231, 232, the inside auxiliary grooves 341, 342 extend linearly along the axial direction. The depth (the dimension in the radial direction) of the inside auxiliary grooves 341, 342 is set to be substantially equal to the depth of the auxiliary grooves 231, 232 and ⅓ of the radial dimension of the salient poles 224. As described above, the inside auxiliary grooves 341, 342 are at symmetrical positions with respect to the circumferential center line S of the salient pole 224. Thus, the angle from the circumferential center line S to the outer side surface 341b of the inside auxiliary groove 341 about the axis P and the angle from the circumferential center line S to the outer side surface 342b of the inside auxiliary groove 342 about the axis P are equal to each other. Hereinafter, this angle is referred to as a positional angle KC2 of the inside auxiliary grooves 341, 342 (see FIG. 18B).

Figure 19A:
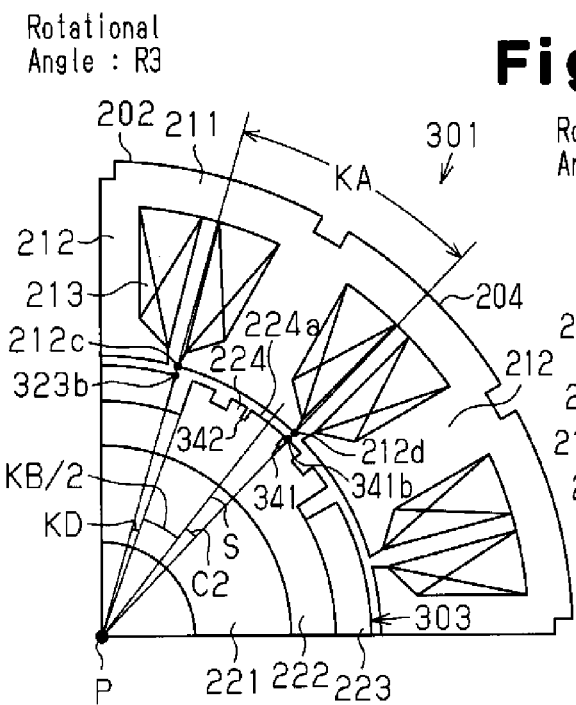
FIG. 19A is a partial plan view showing a state in which the rotor of the motor shown in FIG. 14 is at a rotational angle R3.

If the opening angle between a magnet 223 and a salient pole 224 about the axis P is indicated by KD, the positional angle KC2 of the inside auxiliary grooves 341, 342 is set to satisfy the expression KC2=KA−KB/2−KD. As in the second embodiment, KA and KB are defined as the opening degree of the surface 212*b* of each tooth 212 and the opening degree of each salient pole 224, respectively (see FIG. 15A). Accordingly, as shown in FIG. 19A, when the circumferential first end 212*c* of the surface 212*b* of a tooth 212 is aligned in the radial direction with the circumferential first end 323*b* of the magnet 223 adjacent to the opposed salient pole 224 (specifically, a part at which the circumferential side surface of the magnet 223 and the outside surface 323*a* in the radial direction intersect), the circumferential second end 212*d* of the tooth 212 is aligned in the radial direction with the outer side surface 341*b* of the inside auxiliary groove 341 (specifically, a part at which the side surface 341*b* and the outside surface 224*a* of the salient pole 224 intersect). Likewise, when the circumferential second end 212*d* of the tooth 1 is aligned in the radial direction with the circumferential first end 323*c* of the magnet 223 adjacent to the opposed salient pole 224 (the bottom right magnet 223 in FIG. 19A) as shown in FIG. 19D, the circumferential first end 212*c* of the surface 212*b* of the tooth 212 is aligned in the radial direction with the outer side surface 342*b* of the inside auxiliary groove 342.

Figure 20:
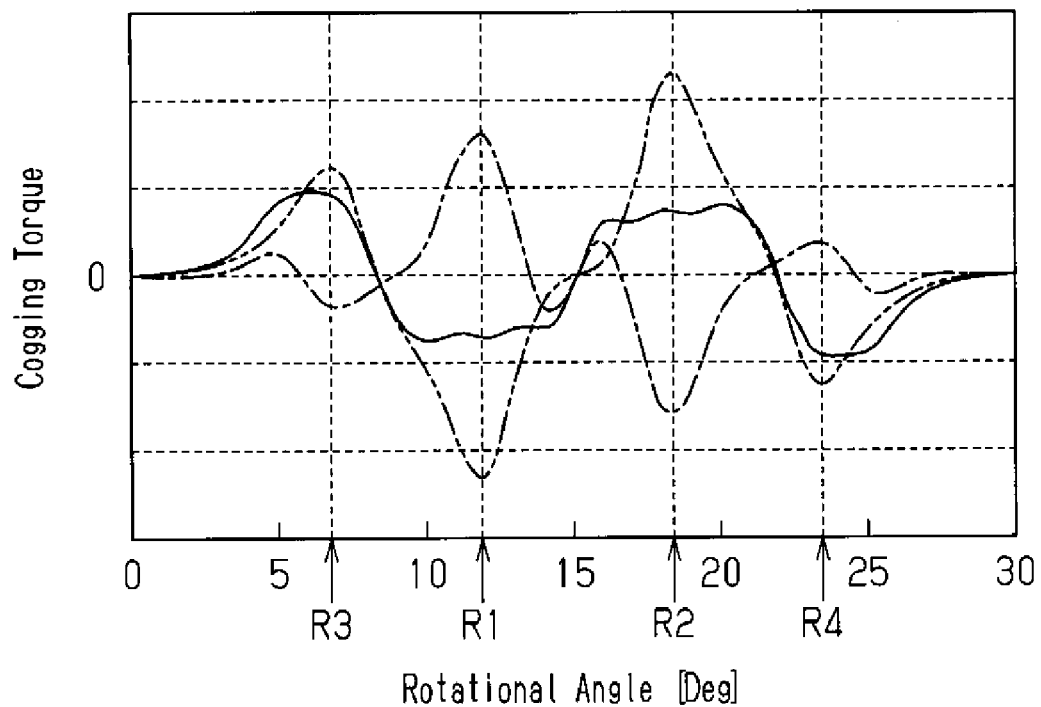
FIG. 20 is a graph showing the relationship between the rotational angle of the rotor and the cogging torque in the motor shown in FIG. 14A.

FIG. 20 shows the waveform of the cogging torque when the rotor 303 of the present embodiment is rotating. The waveform represented by the alternate long-and-two-short dashed line in FIG. 20 is the waveform of the main component of the cogging torque, and is the same as the waveform of the cogging torque in a rotor having neither auxiliary grooves 231, 232 nor inside auxiliary grooves 341, 342 in the salient poles 224. The waveform represented by the alternate long-and-short dashed line is the waveform of the cogging torque generated by the auxiliary grooves 231, 232 and the inside auxiliary grooves 341, 342. The waveform represented by the solid line is the waveform of the cogging torque generated in the motor 301 of the present embodiment, and is a composite waveform of the main component of the cogging torque (the waveform represented by the alternate long-and-two-short dashed line) and the cogging torque waveform generated by the first auxiliary grooves 231, 232 and the inside auxiliary grooves 341, 341 (the waveform represented by the alternate long-and-short dashed line).

The rotational angle of the rotor 303 shown in FIG. 19, that is, the rotational angle when the circumferential first end 212*c* of a tooth 212 is aligned with the circumferential first end 323*b* of a magnet 223 adjacent to the opposed salient pole 224 is defined as R3. At this time, at least a part of the tooth 212 is moved to a non-opposed state from the state opposed to the magnet 223 in the radial direction. Thus, magnetic flux is likely to be concentrated in a part close to the circumferential first end 212*c* of the tooth 212. As a result, the main component of the cogging torque is increased.

In the motor 301 of the present embodiment, the positional angle KC2 of the inside auxiliary grooves 341, 342 is set to satisfy the expression KC2=KA−KB/2. Thus, the circumferential second end 212*d* of the tooth 212 is aligned in the radial direction with the outer side surface 341*b* of the inside auxiliary groove 341 at the rotational angle R3. Therefore, the flux at the time is easily dispersed to the circumferential second end 212*d* of each tooth 212, and is less likely to be concentrated in the vicinity of the circumferential first end 212*c* of the tooth 212. As shown in FIG. 20, the cogging torque generated by the auxiliary grooves 231, 232 and the inside auxiliary grooves 341, 342 has at the rotational angle R3 a component of the opposite phase (positive) to the cogging torque, that is, a component cancelling the main component of the cogging torque. The cancelling component is generated by the inside auxiliary groove 341. Therefore, the cogging torque of the entire motor 301 (the waveform indicated by the solid line) has a waveform in which the peak of the main component of the cogging torque at the rotational angle R3 is reduced. As described above, the cogging torque generated can be reduced by the inside auxiliary groove 341, and the rotation performance of the rotor 303 is improved.

The other inside auxiliary groove 342 operates in the same manner as the inside auxiliary groove 341. Specifically, when the circumferential second end 212*d* of the tooth 212 is aligned in the radial direction with the circumferential first end 323*c* of the magnet 223 adjacent to the opposed salient pole 224 as shown in FIG. 19D (at the rotational angle R4 in FIG. 20), the circumferential first end 212*c* of the tooth 212 is aligned in the radial direction with the outer side surface 342*b* of the inside auxiliary groove 342. Thus, as in the case of the inside auxiliary groove 341 described above, the cogging torque generated by the auxiliary grooves 231, 232 and the inside auxiliary grooves 341, 342 functions as a component cancelling the component of the opposite phase of the main component of the cogging torque at the rotational angle R4, that is, the main component of the cogging torque. This further reduces the cogging torque, and the rotation performance of the rotor 303 is improved.

Figure 19B:
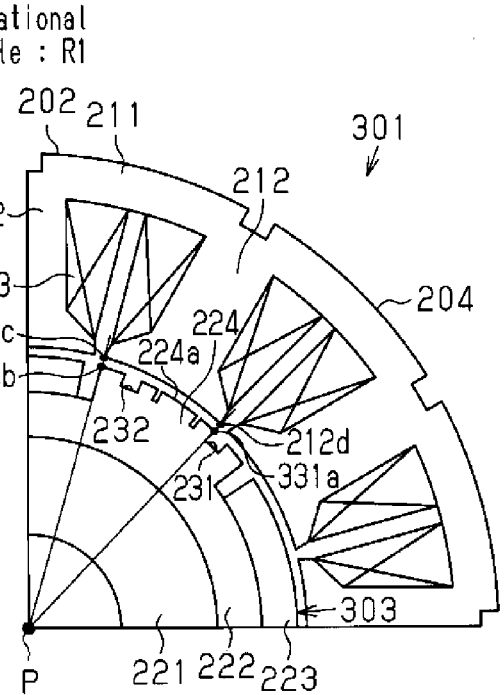
FIG. 19B is a partial plan view showing a state in which the rotor of the motor shown in FIG. 14 is at a rotational angle R1.
Figure 19C:
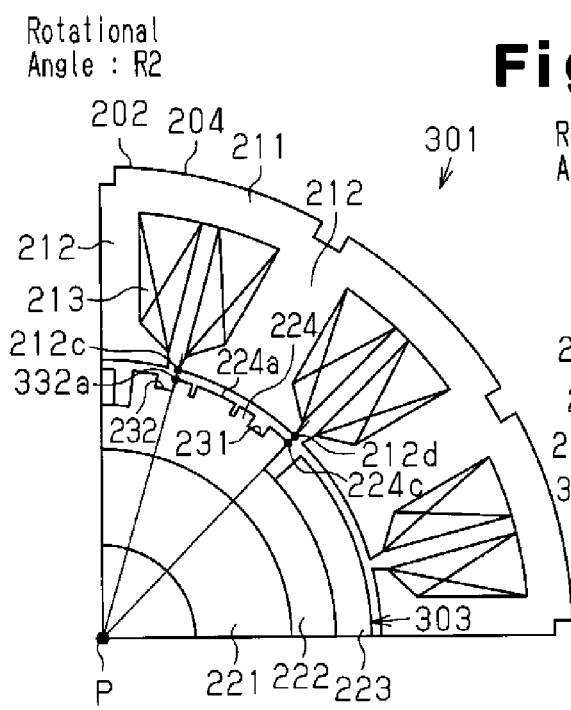
FIG. 19C is a partial plan view showing a state in which the rotor of the motor shown in FIG. 14A is at a rotational angle R2.
Figure 19D:
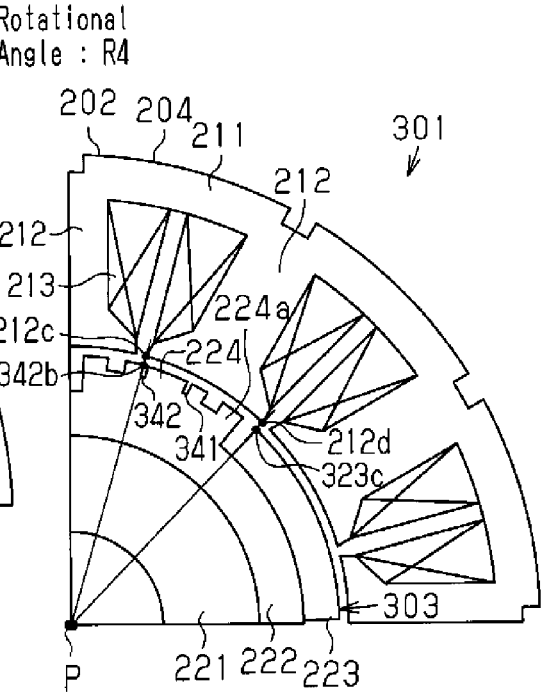
FIG. 19D is a partial plan view showing a state in which the rotor of the motor shown in FIG. 14A is at a rotational angle R4.

Also, since the auxiliary grooves 231, 232 are provided in addition to the inside auxiliary grooves 341, 342 in the present embodiment, the cogging torque is reduced also at the rotational angles R1 and R2 as described in the second embodiment (refer to FIGS. 19B, 19C, and 20).

The graph of the alternate long-and-short dashed line in FIG. 17 shows the cogging torque ratio when the ratio W2/T is changed, in which W2 represents the circumferential width of the inside auxiliary grooves 341, 342 (see FIG. 18B) with reference to the outer side surfaces 341*b*, 342*b* located outside of the inside auxiliary grooves 341, 342, and T represents the circumferential interval T between the distal ends of adjacent teeth 212 (see FIG. 18B), or between the protruding portions 212*a*. In FIG. 17, the cogging torque when W2/T=0, that is, the cogging torque in a configuration without the inside auxiliary grooves 341, 342, is defined as 1. As shown in FIG. 17, the cogging torque decreases from W2/T=0 to W2/T=0.6. The cogging torque has the minimum value of 0.7 when W2/T=0.6. In the range from W2/T=0.6 to W2/T=1.2, the cogging torque increases from the minimum value, but remains less than 1. That is, the cogging torque is less than 1 in the range of 0<W2/T<1.2. Thus, if W2/T is set to a value in this range, the cogging torque is expected to be lower than that in the case where no inside auxiliary grooves 341, 342 are formed. If W2/T=0.6, the cogging torque is reduced to approximately 70%. That is, the cogging torque is most significantly reduced.

The present embodiment provides the following advantages.

(10) In the present embodiment, the inside auxiliary grooves 341, 342 are formed in the outside surface 224*a* of each salient pole 224 of the rotor 303, and the positional angle KC2 satisfies the expression KC2=KA−KB/2−KD. Therefore, when the circumferential first end 212*c* of the surface 212*b* of each tooth 212 is aligned in the radial direction with the circumferential first end 323*b* of the magnet 223 adjacent to the opposed salient pole 224 while the rotor 303 is rotating, the circumferential second end 212*d* of the tooth 212 is aligned in the radial direction with the side surface 341*b* of the inside auxiliary groove 341. Also, when the circumferential second end 212*d* of the surface 212*b* of a tooth 212 is aligned in the radial direction with the circumferential first end 323*c* of the magnet 223 adjacent to the opposed salient pole 224 while the rotor 303 is rotating, the circumferential first end 212*c* of the tooth 212 is aligned in the radial direction with the side surface 342b of the inside auxiliary groove 342. At this time the cogging torque generated in the vicinity of the circumferential ends 212c, 212d of the tooth 212 that are aligned in the radial direction with the side surfaces 341b, 342b of the inside auxiliary grooves 341, 342 (the cogging torque generated by the inside auxiliary grooves 341, 342) serves as a cancelling component reducing the cogging torque (main component) generated in the vicinity of the circumferential ends 212c, 212d of the tooth 212 that is aligned in the radial direction with the circumferential first ends 323b, 323c of the magnet 223. Thus, it is possible to reduce the cogging torque generated by the entire motor 301, so as to improve the rotation performance of the rotor 303.

(11) In the present embodiment, the inside auxiliary grooves 341, 342 are formed in a pair along the circumferential direction to be symmetrical with respect to the circumferential center line S in each salient pole 224. Since the inside auxiliary grooves 341, 342 are formed in a pair to correspond to the circumferential first ends 323b, 323c of the magnets 223 on both sides of the salient pole 224, the cogging torque is further reduced.

(12) In the present embodiment, the ratio W2/T between the circumferential width W2 of the inside auxiliary grooves 341, 342 and the interval T between circumferentially adjacent teeth 212 is set to satisfy the expression 0<W2/T<1.2. This enables further reduction in the cogging torque (see FIG. 17), and improves the rotation performance of the rotor 303.

(13) In the present embodiment, since each salient pole 224 has both of the auxiliary grooves 231, 232 serving as the first auxiliary grooves and the inside auxiliary grooves 341, 342 serving as the second auxiliary grooves, the cogging torque is further reduced.

A fourth embodiment of the present invention will now be described with reference to the drawings.

A motor 401 of the present embodiment is different from the second embodiment in that auxiliary grooves (tooth auxiliary grooves 451, 452) are formed in each tooth 212, but not in the salient poles 224. Thus, like or the same reference numerals are given to those components that are like or the same as the corresponding components of the second embodiment, and the detailed description thereof will be omitted.

Figure 21A:
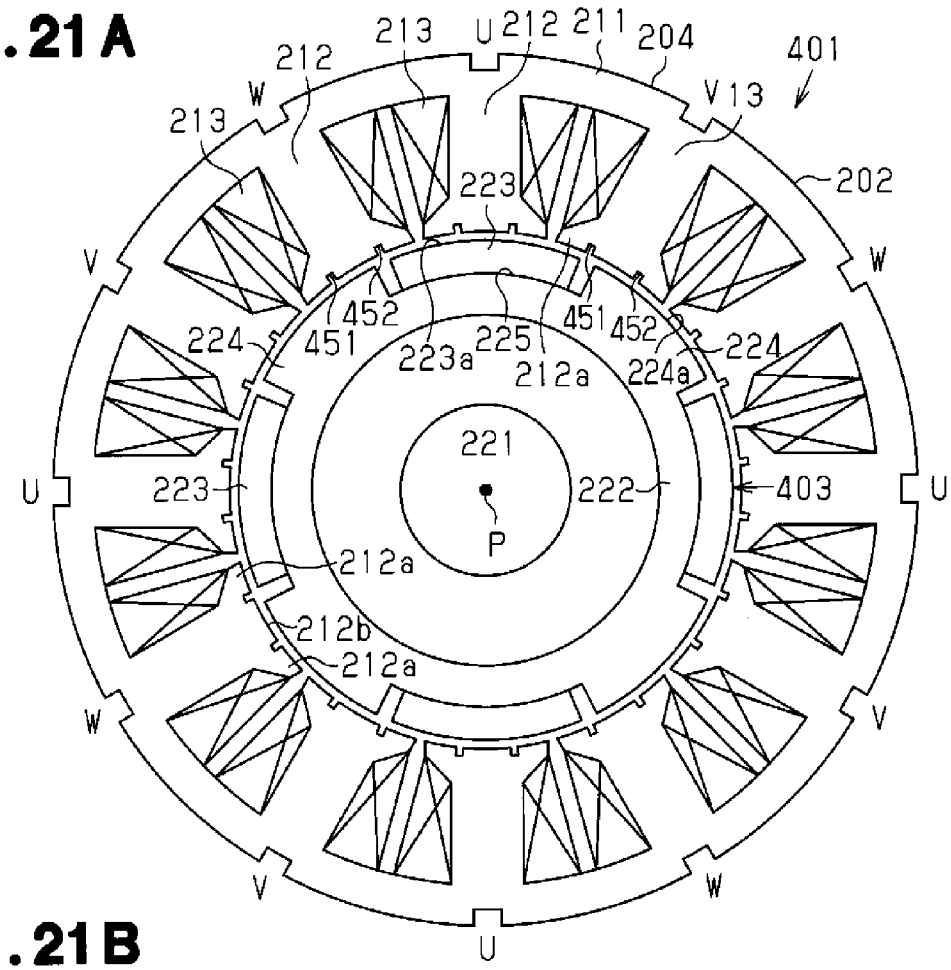
FIG. 21A is a plan view illustrating a motor according to a third embodiment of the present invention.
Figure 21B:
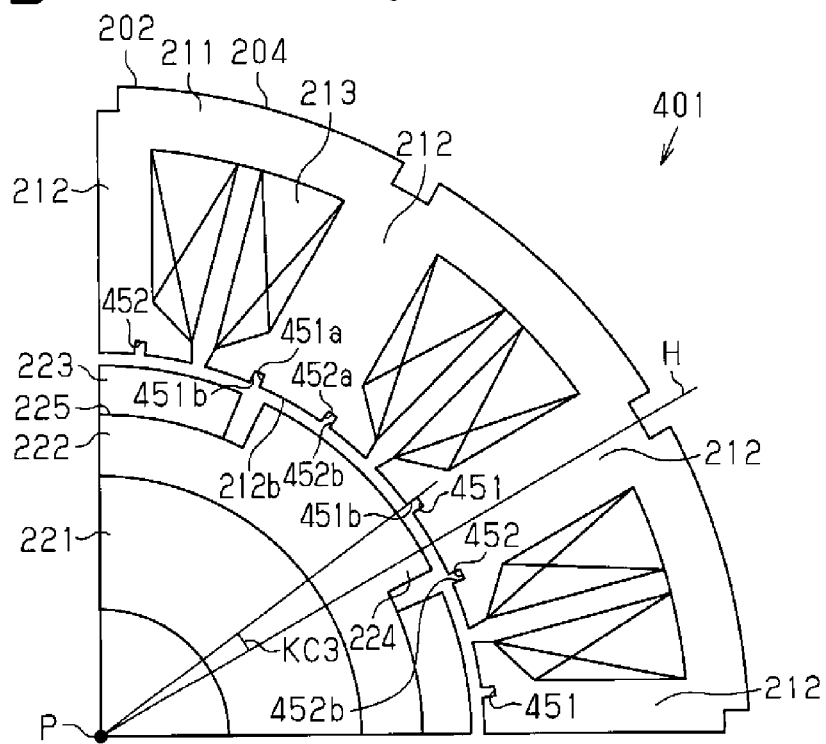
FIG. 21B is a partial plan view showing a part of FIG. 21A.

As shown in FIGS. 21A and 21B, a pair of tooth auxiliary grooves 451, 452 is formed in the surface 212b of each tooth 212. The tooth auxiliary grooves 451, 452 have a pair of side surfaces 451a, 451b and a pair of side surfaces 452a, 452b opposed to each other in the circumferential direction, respectively, and extend in the axial direction. The tooth auxiliary grooves 451, 452 have the same shape, and are formed to be symmetrical with respect to the circumferential center line H of each tooth 212. The side surfaces located inside (the ones closer to the circumferential center line H) are defined as first side surfaces 451a, 452a, and the side surfaces located outside (the ones closer to the circumferential ends of the tooth 212) are defined as second side surfaces 451b, 452b.

The tooth auxiliary grooves 451, 452 are formed to be symmetrical with respect to the circumferential center line H of each tooth 212. Thus, the angle from the circumferential center line H to the outer side surface 451b of the tooth auxiliary groove 451 about the axis P and the angle from the circumferential center line H to the outer side surface 452b of the tooth auxiliary groove 452 about the axis P are equal to each other. Hereinafter, this angle is referred to as a positional angle KC3 of the tooth auxiliary grooves 451, 452 (see FIG. 21B).

Figure 22A:
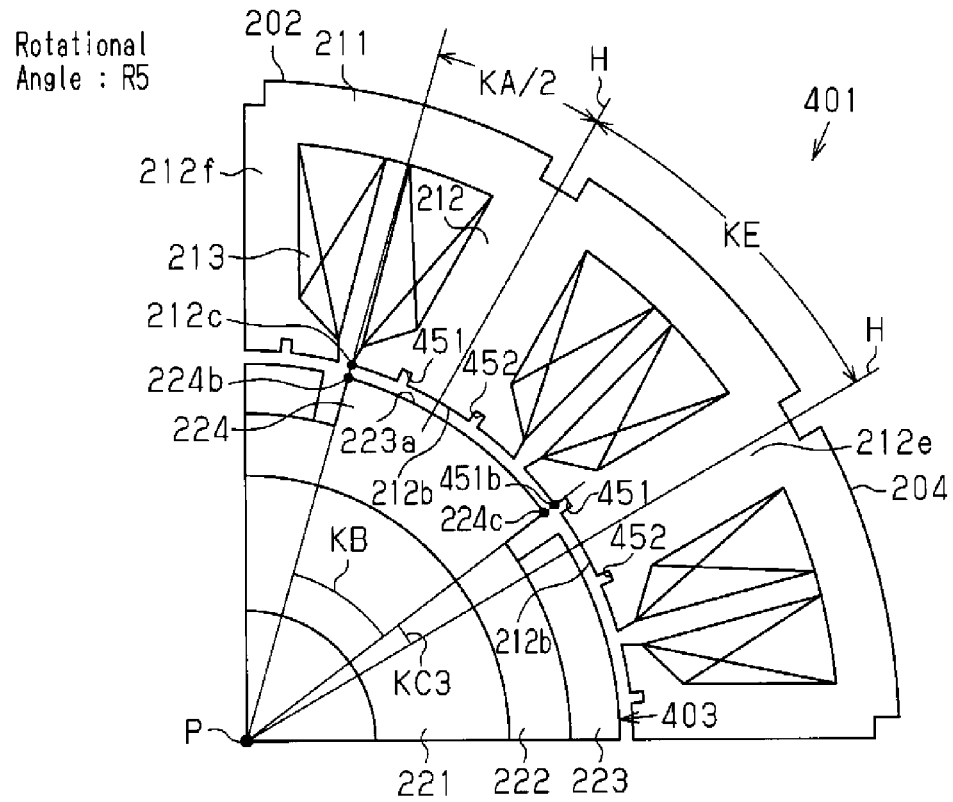
FIG. 22A is a partial plan view showing a state in which the rotor of the motor shown in FIG. 21A is at a rotational angle R5.
Figure 22B:
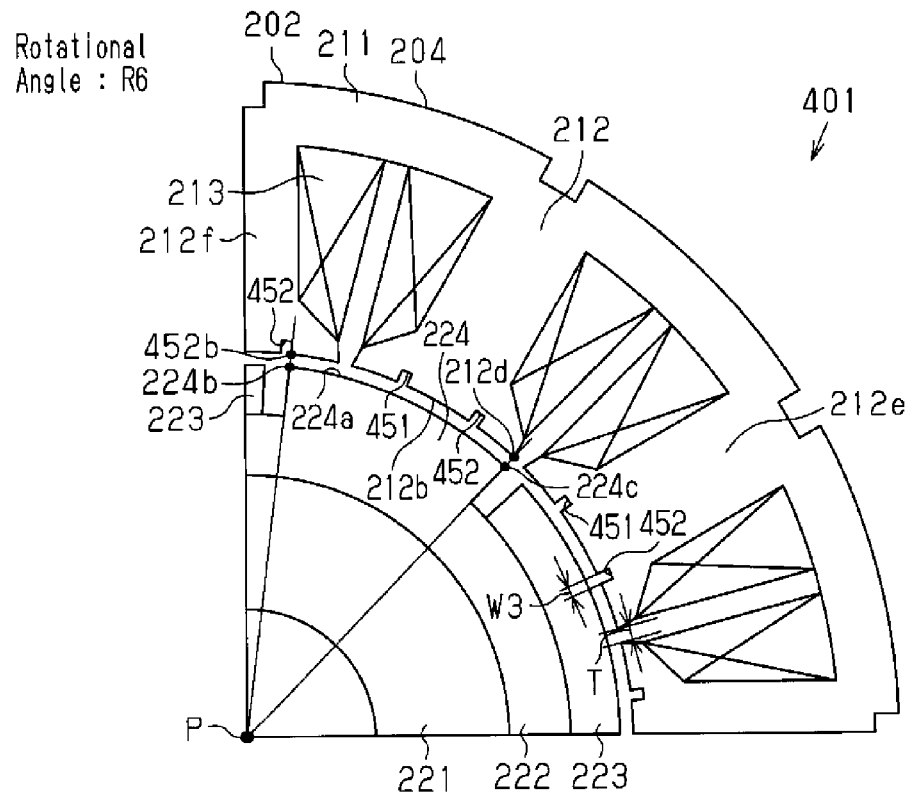
FIG. 22B is a partial plan view showing a state in which the rotor of the motor shown in FIG. 21A is at a rotational angle R6.

If the angle between the circumferential center lines H of adjacent pair of the teeth 212 is indicated by ME, the positional angle KC3 of the tooth auxiliary grooves 451, 452 is set to satisfy the expression KC3=KA/2+KE−KB. As in the second embodiment, KA and KB are defined as the opening degree of the surface 212b of each tooth 212 and the opening degree of each salient pole 224, respectively (see FIG. 15A). FIG. 22A shows a state in which the circumferential first end 224b of a salient pole 224 is aligned in the radial direction with the circumferential first end 212c of the surface 212b of the opposed tooth 212. In this state, the circumferential second end 224c of the salient pole 224 is aligned in the radial direction with the outer side surface 451b of the tooth auxiliary groove 451 (specifically, a part where the side surface 451b and the surface 212b of the tooth 212 intersect) in the tooth (the tooth 212e in FIG. 22A) that is adjacent to the tooth 212 that is aligned with the circumferential first end 224b. Likewise, FIG. 22B shows a state in which the circumferential second end 224c of a salient pole 224 is aligned in the radial direction with the circumferential second end 212d of the opposed tooth 212. In this state, the circumferential first end 224b of the salient pole 224 is aligned in the radial direction with the outer side surface 452b of the tooth auxiliary groove 452 in the tooth (the tooth 212f in FIG. 22B) that is adjacent to the tooth 212 that is aligned with the circumferential second end 224c.

Figure 23:
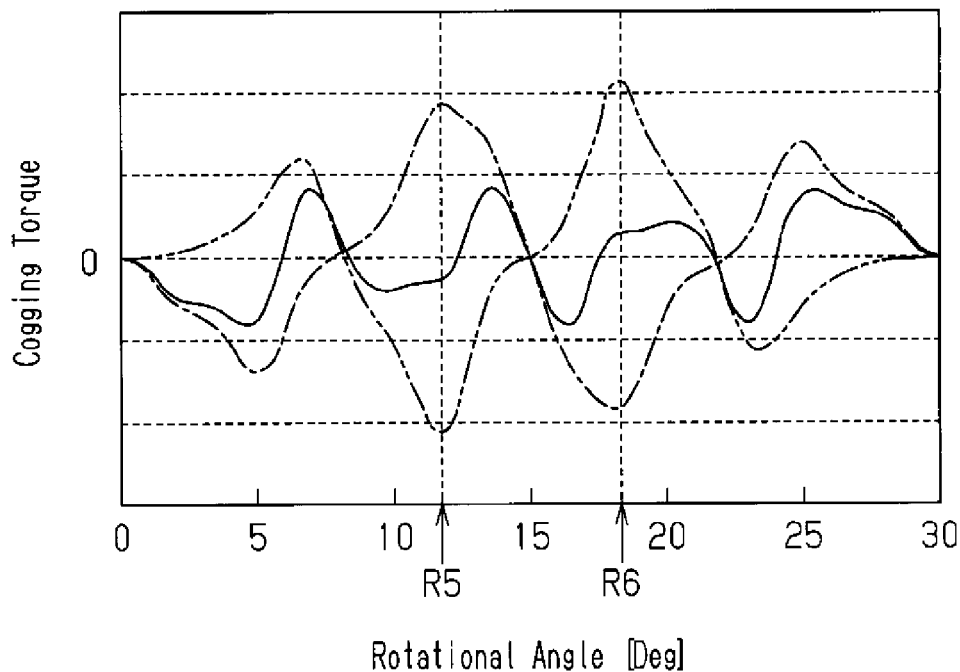
FIG. 23 is a graph showing the relationship between the rotational angle of the rotor and the cogging torque in the motor shown in FIG. 21A.

FIG. 23 shows the waveform of the cogging torque when the rotor 403 of the present embodiment is rotating. The waveform represented by an alternate long-and-two-short dashed line in FIG. 23 is the waveform of the main component of the cogging torque, and is the same as the waveform of the cogging torque in a rotor having no tooth auxiliary grooves 451, 452 in the teeth 212. The waveform represented by an alternate long-and-short dashed line is the waveform of the cogging torque generated by the tooth auxiliary grooves 452. The waveform represented by the solid line is the waveform of the cogging torque generated in the motor 401 of the present embodiment, and is a composite waveform of the main component of the cogging torque (the waveform represented by the alternate long-and-two-short dashed line) and the cogging torque waveform generated by the tooth auxiliary grooves 451, 452 (the waveform represented by the alternate long-and-short dashed line).

The rotational angle of the rotor 403 shown in FIG. 22A, that is, the rotational angle when the circumferential first end 224b of each salient pole 224 is aligned with the circumferential first end 212c of the opposed tooth 212 is defined as R5. At this time, magnetic flux is likely to be concentrated in a part close to the circumferential first end 224b of the salient pole 224. As a result, the main component of the cogging torque is increased, and the main component of the cogging torque has the negative peak value (see FIG. 23).

In the motor 401 of the present embodiment, the positional angle KC3 of the tooth auxiliary grooves 451, 452 is set to satisfy the expression KC3=KA/2+KE−KB. Thus, the circumferential second end 224c of each salient pole 224 is aligned in the radial direction with the outer side surface 451b of the tooth auxiliary groove 451 of the tooth 212e at the rotational angle R5. Therefore, the flux is easily dispersed in the vicinity of the circumferential second end 224c of each salient pole 224, and is less likely to be concentrated in the vicinity of the circumferential first end 224b of each salient pole 224. As shown in FIG. 23, the cogging torque generated by the tooth auxiliary grooves 451, 452 has at the rotational angle R5 a peak of the opposite phase (positive) to the cogging torque, that is, a component cancelling the main component of the cogging torque. The cancelling component is generated by the tooth auxiliary groove 451. Therefore, the cogging torque of the entire motor 401 (the waveform indicated by the solid line) has a waveform in which the peak of the main component of the cogging torque at the rotational angle R5 is reduced. As described above, the cogging torque generated can be reduced by the tooth auxiliary groove 451, and the rotation performance of the rotor 403 is improved.

The other tooth auxiliary groove 452 operates in the same manner as the tooth auxiliary groove 451. Specifically, when the circumferential second end 224c of a salient pole 224 is aligned in the radial direction with the circumferential second end 212d of the opposed tooth 212 (the rotational angle R6 in FIG. 23), the circumferential first end 212c of the tooth 212 is aligned in the radial direction with the outer side surface 452b of the tooth auxiliary groove 452 of the tooth 212f. Thus, as in the case of the tooth auxiliary groove 451 described above, the cogging torque generated by the tooth auxiliary grooves 451, 452 functions as a component cancelling the peak of the opposite phase of the main component of the cogging torque at the rotational angle R6, that is, the main component of the cogging torque. Therefore, the cogging torque of the entire motor 401 (the waveform indicated by the solid line) is kept low. This further reduces the cogging torque, and the rotation performance of the rotor 403 is improved.

Figure 24:
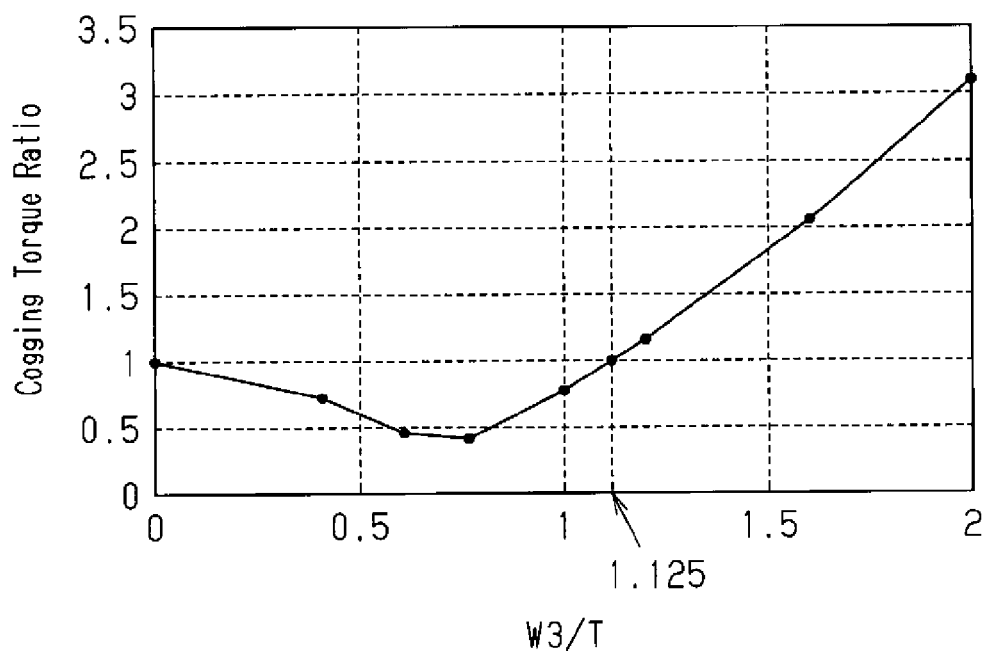
FIG. 24 is a graph showing the relationship between W3/T and the cogging torque ratio.

FIG. 24 shows the cogging torque ratio when the ratio W3/T is changed, in which W3 represents the circumferential width of the tooth auxiliary grooves 451, 452 (see FIG. 22B) with reference to the outer side surfaces 451b, 452b located outside of the tooth auxiliary grooves 452, 451, and T represents the circumferential interval T between the distal ends of adjacent teeth 212 (see FIG. 22S), or between the protruding portions 212a. In FIG. 24, the cogging torque when W3/T=0, that is, the cogging torque in a configuration without the tooth auxiliary grooves 451, 452, is defined as 1. As shown in FIG. 24, the cogging torque decreases as the ratio W3/T increases from 0. The cogging torque has the minimum value (approximately 50%) when W3/T is approximately 0.7. When W3/T increases further, the cogging torque starts increasing from the minimum value. In the range of W3/T<1.125, the cogging torque is less than 1. That is, the cogging torque is less than 1 in the range of 0<W3/T<1.125. Thus, if the ratio W3/T is set to a value in this range, the cogging torque is expected to be lowered than that in the case where no tooth auxiliary grooves 510, 520 are formed. If W3/T=approximately 0.7, the cogging torque is reduced to approximately 50%. That is, the cogging torque is most significantly reduced.

The present embodiment provides the following advantages.

(14) In the present embodiment, the tooth auxiliary grooves 451, 452 are formed in the surface 212b of each tooth 212, and the positional angle KC3 of the tooth auxiliary grooves 451, 452 satisfies the expression KC3=KA/2+KE−KB. Therefore, when the circumferential first end 224b of each salient pole 224 is aligned in the radial direction with the circumferential end 212c of the opposed tooth 212 while the rotor 403 is rotating, the circumferential second end 224c of the salient pole 224 is aligned in the radial direction with the side surface 451b of the tooth auxiliary groove 451 of the tooth 212e, which is adjacent to the tooth 212 aligned with the circumferential end. Also, when the circumferential second end 224c of each salient pole 224 is aligned in the radial direction with the circumferential second end 212d of the opposed tooth 212 while the rotor 403 is rotating, the circumferential first end 224b of the salient pole 224 is aligned in the radial direction with the side surface 452b of the tooth auxiliary groove 452 of the tooth 212f, which is adjacent to the tooth 212 aligned with the circumferential end. At this time the cogging torque generated by the tooth auxiliary grooves 451, 452 serves as a cancelling component that suppresses the main component of the cogging torque. The cogging torque generated in the entire motor 401 therefore can be reduced, and the rotation performance of the rotor 403 is improved.

(15) In the present embodiment, the tooth auxiliary grooves 451, 452 are formed in a pair along the circumferential direction to be symmetrical with respect to the circumferential center line H in each tooth 212. This further reduces the cogging torque.

(16) In the present embodiment, the ratio W3/T between the circumferential width W3 of the tooth auxiliary grooves 451, 452 and the interval T between circumferentially adjacent teeth 212 is set to satisfy the expression 0<W3/T<1.125. This enables further reduction in the cogging torque (see FIG. 24), and improves the rotation performance of the rotor 403.

The second to fourth embodiments may be modified as follows.

In the third embodiment, the auxiliary grooves 231, 232 serving as first auxiliary grooves and the inside auxiliary grooves 341, 342 serving as second auxiliary grooves are both provided. However, only the inside auxiliary grooves 341, 342 may be provided.

The configuration of the fourth embodiment may include the auxiliary grooves 451, 452 of the second embodiment or the inside auxiliary grooves 341, 342 of the third embodiment.

In the second to fourth embodiments, the auxiliary grooves 231, 232, the inside auxiliary grooves 341, 342, and the tooth auxiliary grooves 451, 452 are provided in pairs. However, only one of each pair may be provided.

The second to fourth embodiments are applied to the eight-magnetic pole rotor 403 formed by four salient poles 224 and four magnets 223. However, the number of magnetic poles may be changed as necessary. In this case, the number of magnetic poles of the stator 202 is changed as necessary.

A fifth embodiment of the present invention will now be described with reference to the drawings.

Figure 25:
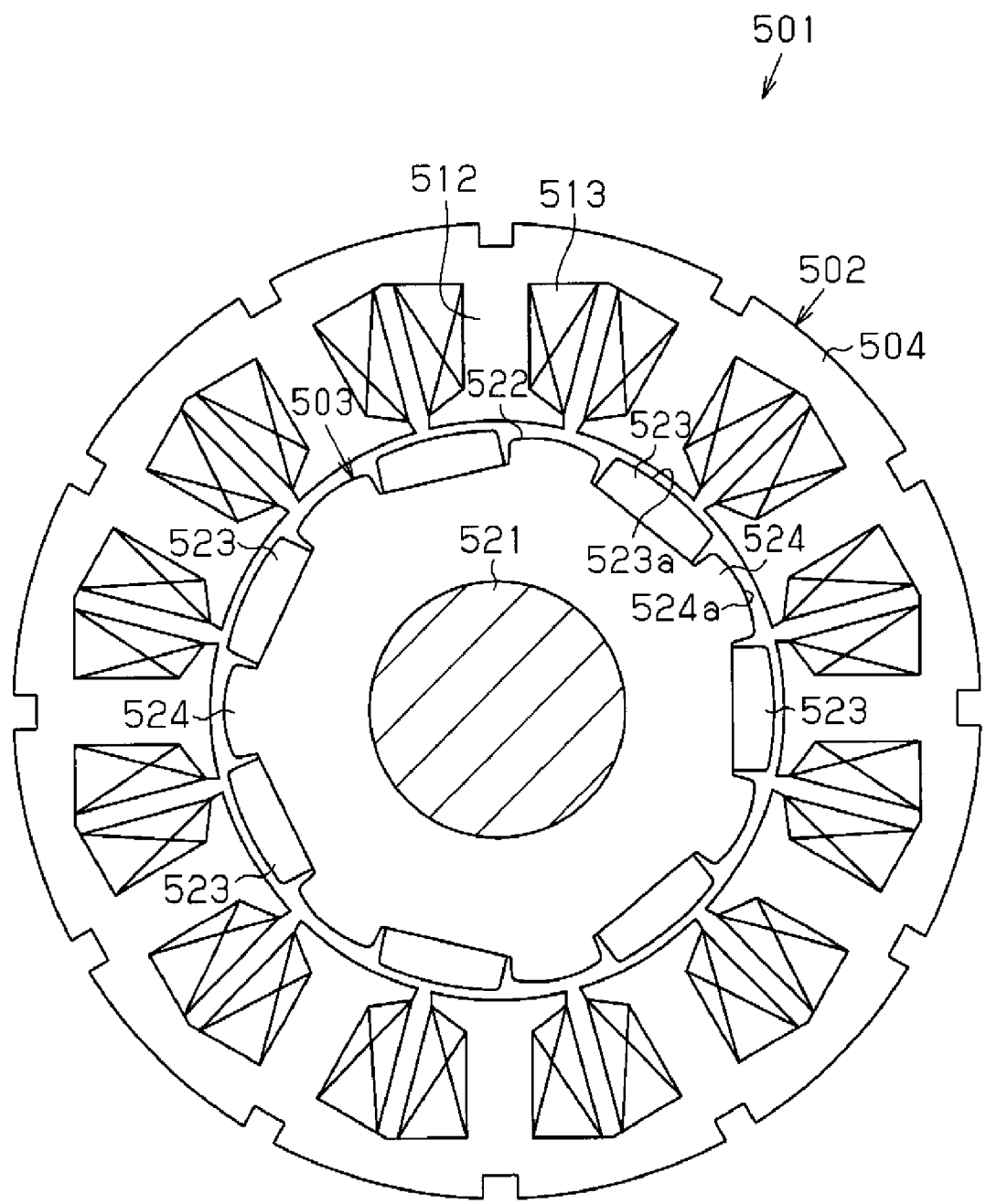
FIG. 25 is a plan view illustrating a motor according to a fifth embodiment of the present invention.
Figure 26:
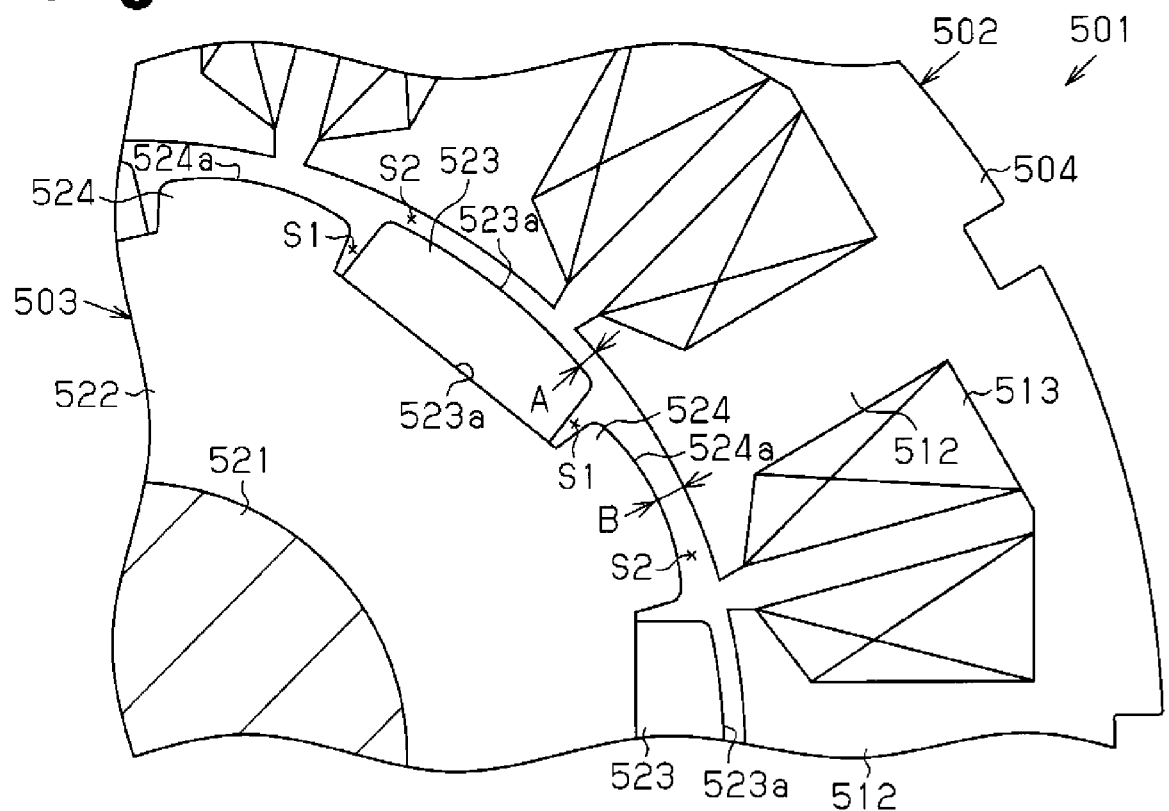
FIG. 26 is an enlarged partial view illustrating the motor shown in FIG. 25.

FIGS. 25 and 26 show an inner rotor brushless motor 501. The rotor 503 used in the motor 501 of the present embodiment includes a substantially annular rotor core 522, seven magnets 523, and salient poles 524. The rotor core 522 is made of magnetic metal and adhered to the outer circumferential surface of a rotary shaft 521. The magnets 523 are arranged on the outer circumferential surface of the rotor core 522 along the circumferential direction. Each salient pole 524 is located in the outer circumferential portion of the rotor core 522 and between a circumferentially adjacent pair of the magnets 523. The magnets 523 function as north poles. The salient poles 524 are integrally formed with the rotor core 522. The magnets 523 and the salient poles 524 are alternately arranged on the outer circumferential portion of the rotor 503 in the circumferential direction at equal angular intervals. In the present embodiment, each magnet 523 is located at a position opposite to, or 180° away from, one of the salient poles 524. The rotor 503 is a consequent pole type with fourteen magnetic poles that causes the salient poles 524 to function as south poles in relation to the north pole magnets 523. A stator 502 is a twelve magnetic pole-type having a stator core 504 with twelve teeth 512. A coil 513 is wound about each tooth 512.

The circumferential length of each magnet 523 of the rotor 503 is slightly greater than that of each salient pole 524. Each magnet 523 is substantially formed as a rectangular prism having a curved outside surface 523a and a flat inside surface 523b. The inside surface 523b of each magnet 523 is fixed to a fixing surface 525 provided between a circumferentially adjacent pair of the salient poles 524 in the rotor core 522. A first gap S1 exists between each magnet 523 and a circumferentially adjacent salient pole 524. The outside surfaces 523a of the magnets 523 are curved and located on the same circumference.

The circumferential length of each salient pole 524 is less than that of each magnet 523 by the amount corresponding to the gap S1 between the salient pole 524 and the magnet 523. Each salient pole 524 has a sectoral cross section in the axial direction, and has an outside surface 524a that bulges outward in the radial direction. That is, the outside surface 524a of each salient pole 524 is curved such that its center in the circumferential direction protrudes relative to both ends. In other words, the outside surface 524a is curved such that it approaches the radially inner end as the distance from the center in the circumferential direction increases toward either end in the circumferential direction. The curvature of all the outside surfaces 524a is the same, and symmetrical with respect to the circumferential center.

The outside surfaces 524a and 523a of the salient poles 524 and the magnets 523 are arranged such that the outside surfaces 524a of the salient poles 524 are radially inward of the outside surfaces 523a of the magnets 523. That is, in a second gap S2 between the stator 502 (the surface (the distal surface) of the teeth 512) and the rotor 503, a gap distance B corresponding to the salient pole 524 (in this case, the shortest gap distance at the circumferential center) is set to be greater than a gap distance A corresponding to the magnet 523 (the shortest gap distance constant in the circumferential direction).

Figure 27:
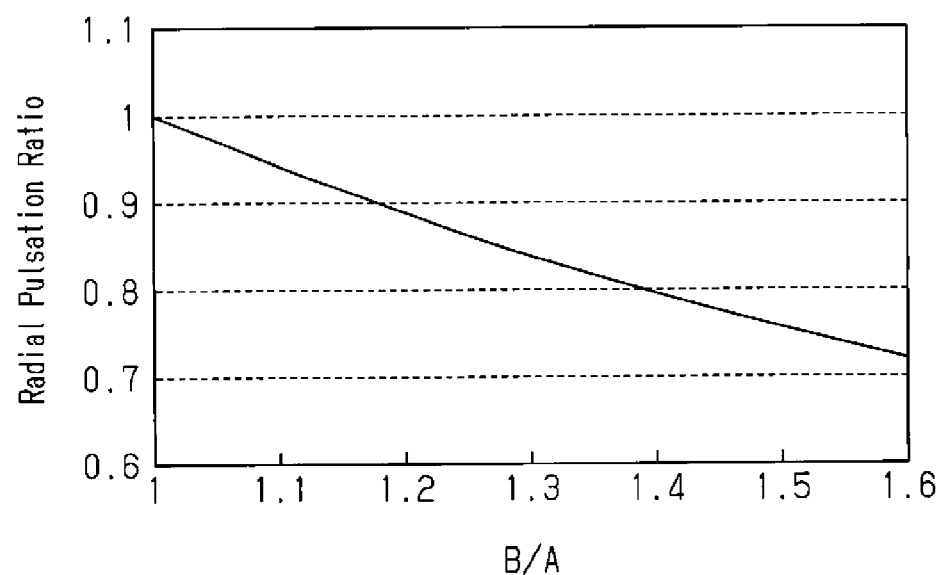
FIG. 27 is a graph showing the relationship between the gap distance ratio B/A and the radial pulsation ratio of the motor shown in FIG. 25.
Figure 28:
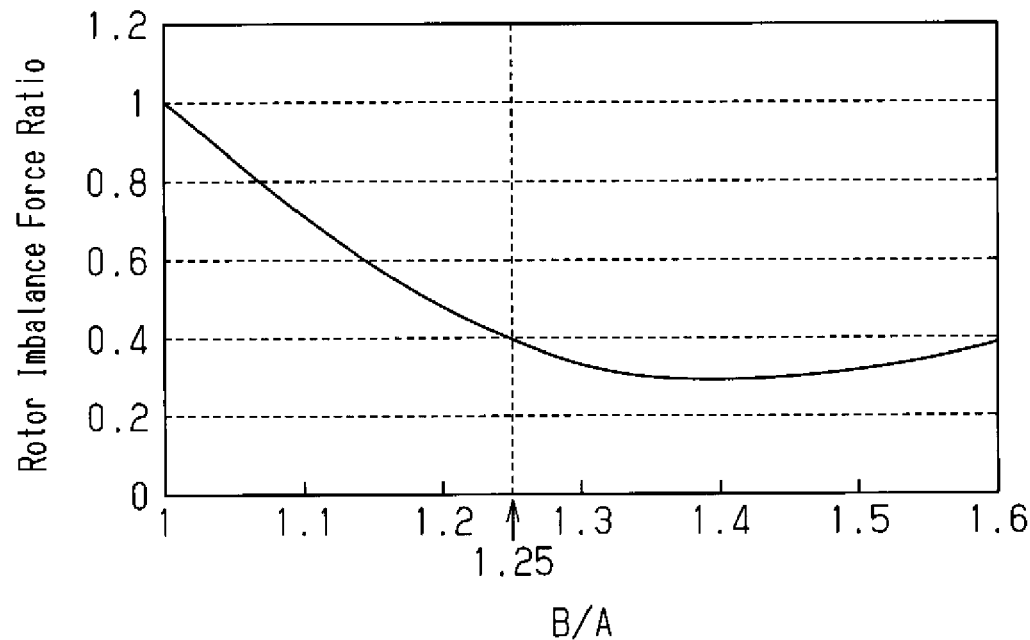
FIG. 28 is a graph showing the relationship between the gap distance ratio B/A and the rotor imbalance force of the motor shown in FIG. 25.
Figure 29:
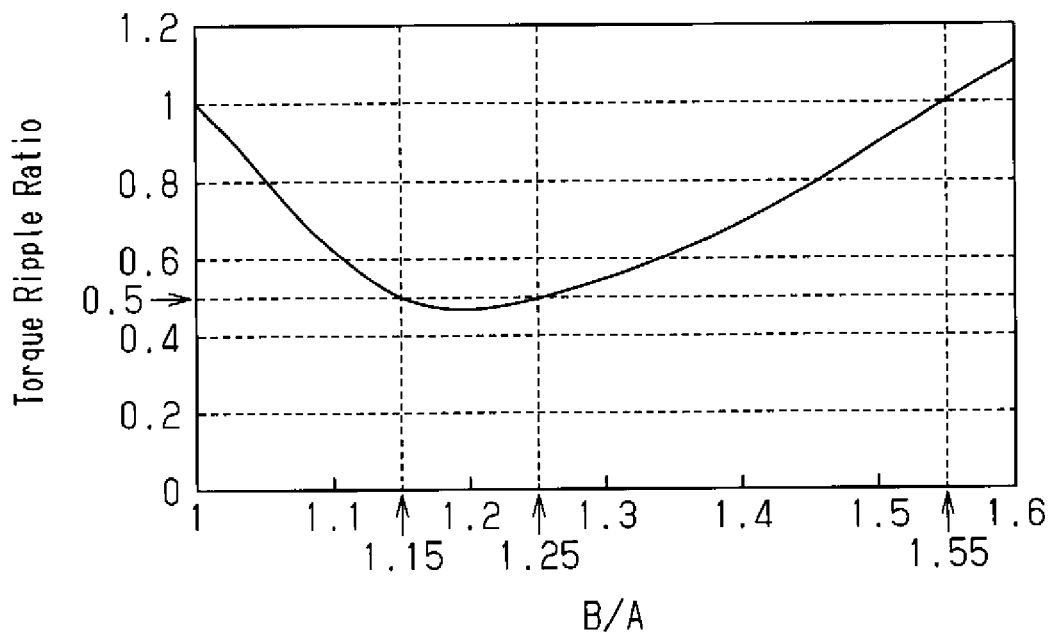
FIG. 29 is a graph showing the relationship between the gap distance ratio B/A and the torque ripple ratio of the motor shown in FIG. 25.

FIGS. 27, 28, and 29 show the radial pulsation ratio, the rotor imbalance ratio, and the torque ripple ratio, respectively, when the ratio B/A of the gap distance B corresponding to the salient pole 524 and the gap distance A corresponding to the magnet 523 is changed in the second gap G2 between the stator 502 and the rotor 503. The radial pulsation, the rotor imbalance force, and the torque ripple are causes of increase in the vibration when the rotor 503 rotates.

FIG. 27 shows the radial pulsation ratio when B/A is changed. The radial pulsation when B/A=1, that is, when the gap distance B and the gap distance A are equal to each other, is defined as 1. As B/A is increased (as the salient pole 524 is moved radially inward compared to the magnet 523), the radial pulsation is reduced from 1 substantially at a constant rate. Specifically, the radial pulsation is reduced so as to be approximately 0.89 when B/A=1.2, approximately 0.8 when B/A=1.4, and approximately 0.72 when B/A=1.6. That is, if 1<B/A, the radial pulsation is expected to be reduced.

FIG. 28 shows the rotor imbalance force ratio when B/A is changed. As in the above case, the rotor imbalance force when B/A=1 is defined as 1. As B/A is increased, the rotor imbalance force decreases. Then, the rotor imbalance force starts slightly increasing after being the minimum value. Specifically, the rotor imbalance force decreases in the range from B/A=1 to B/A=1.4. As B/A approaches 1.4, the rotor imbalance force gradually decreases. When B/A=1.4, the rotor imbalance force has the minimum value of approximately 0.3. In the range from B/A=1.4 to B/A=1.6, the rotor imbalance force slightly increases. When B/A=1.6, the rotor imbalance force increases to approximately 0.4. That is, if 1<B/A, the rotor imbalance force is expected to decreases at least when the measured value of B/A reaches 1.6. Particularly, in the range 1.25<B/A<1.6, the rotor imbalance force becomes approximately 40% or less when B/A=1. That is, the rotor imbalance is reduced significantly.

FIG. 29 shows the torque ripple ratio when B/A is changed. As in the above case, the torque ripple when B/A=1 is defined as 1. As B/A is increased, the torque ripple temporarily decreases. Then, the torque ripple starts slightly increasing after being the minimum value. Specifically, the torque ripple decreases in the range from B/A=1 to B/A=1.2. As B/A approaches 1.2, the torque ripple gradually decreases. When B/A=1.2, the torque ripple has the minimum value of approximately 0.47. In the range from B/A=1.2 to B/A=1.6, the torque ripple increases. From B/A=1.2, the rate of increase of the torque ripple gradually increases. When B/A=1.55, the torque ripple becomes equal to the value when B/A=1. The torque ripple continues increasing after B/A=1.55. That is, when 1<B/A<1.55, the torque ripple is expected to be reduced. Particularly, in the range of 1.15<B/A<1.25, the torque ripple is approximately half the value when B/A=1. That is, the torque ripple is significantly reduced.

Taking the above factors into consideration, in the rotor 503 of the present embodiment, the ratio B/A between the gap distances B and A is set to a value in the range of 1<B/A<1.55. Accordingly, the radial pulsation (FIG. 27), the rotor imbalance force (FIG. 28), and the torque ripple (FIG. 29), which are causes of vibration when the rotor 503 rotates, are reduced. Particularly, to preferentially reduce the rotor imbalance force, B/A is set to approximately 1.4. To preferentially reduce the torque ripple, B/A is set to approximately 1.2. As described above, factors of vibrations during rotation of the rotor 503 are reduced, so that the rotational performance of the rotor 503 is improved.

The present embodiment provides the following advantages.

(17) In the gap S2 between the stator 502 and the rotor 503 of the present embodiment, the ratio B/A between the gap distance A, which corresponds to the magnets 523, and the gap distance B, which corresponds to the salient poles 524 is set to an appropriate value that satisfies 1<B/A. This reduces the radial pulsation, the rotor imbalance force, and the torque ripple, which are causes of vibration when the rotor 503 rotates (see FIGS. 27 to 29), thereby improving the rotational performance of the rotor 503. That is, it is possible to provide a motor 501 of an improved rotation performance.

By setting the ratio B/A of the gap distances A and B to any value in the range of 1.25<B/A<1.6, the rotor imbalance force can be effectively reduced in addition to the reduction in the radial pulsation.

Also, by setting the ratio B/A of the gap distances A and B to any value in the range of 1<B/A<1.55, the torque ripple can be effectively reduced in addition to the reduction in the radial pulsation. In this case, by setting the ratio B/A of the gap distances A and B to any value in the range of 1.15<B/A<1.25, the torque ripple can be further effectively reduced.

Also, by setting the ratio B/A of the gap distances A and B to any value in the range of 1.2<B/A<1.4, both of the rotor imbalance force and the torque ripple can be effectively reduced in addition to the reduction in the radial pulsation.

(18) In the present embodiment, the number of the magnets 523 and the number of the salient poles 524 are both an odd number, and each magnet 523 is at a position opposite to, or 180° away from, one of the salient poles 524. That is, in a configuration in which each magnet 523 is at a position opposite to, or 180° away from, one of the salient poles 524, magnetic imbalance is likely to occur and the vibration during rotation of the rotor 503 is likely to increase. Thus, the optimization of the ratio B/A of the gap distances A and B is significant in reducing the vibration.

The above described fifth embodiment may be modified as follows.

In the fifth embodiment, the shapes of the outside surfaces 524a and 523a of the salient poles 524 and the magnets 523 may be changed as necessary. In the first embodiment, the outside surfaces 523a of the magnets 523 are arcuate and arranged on the same circle, and the outside surface 524a of each salient pole 524 has a greater curvature than that of the outside surface 23a. Also, the outside surfaces 524a, 523a may be curved and located on the same circle. Further, the outside surfaces 524a, 523a may be curved to have a large curvature. The curvature of the outside surfaces 524a, 523a does not need to be constant, but may be changed along the circumferential direction or changed linearly.

Other than these modifications, the shape of the magnets 523 and the shape of the rotor core 522 including the salient poles 524 may be changed as necessary.

The first to fifth embodiments may be modified as follows.

The ranges of the values in each embodiment may be changed as necessary depending on the conditions.

In the above illustrated embodiments, coils of the stators 2, 202, and 502 are formed by segment coils 13. Instead, continuous wires may be wound about the teeth 12.

In the above illustrated embodiments, the present invention is applied to the inner rotor type motors 1, 100, 400, 500. However, the present invention may be applied to an outer rotor type motor.

In the above illustrated embodiments, the shapes of the magnets 23, 223, 523 and the shapes of the rotor cores 22, 222, 522 including the salient poles 24, 224, 524 may be changed as necessarily.

The above illustrated embodiments are configured such that the magnets 23, 223, 523 function as north poles, and the salient poles 24, 224, 524 function as south poles. However, a configuration may be employed in which the magnets 23, 223, 523 function as south poles, and the salient poles 24, 224, 524 function as north poles.

The number of magnetic poles may be changed as necessary in the above illustrated embodiments. In this case, the number of magnetic poles of the stators 2, 202, 502 is changed as necessary.

What is claimed is:

1. A motor comprising:
  a rotor including:
    a rotor core;
    a plurality of magnets arranged along the circumferential direction of the rotor core, the magnets functioning as first magnetic poles; and
    a plurality of salient poles integrally formed with the rotor core, each salient pole being located between a circumferentially adjacent pair of the magnets with gaps in between, and functioning as a second magnetic pole different from the first magnetic poles; and
  a stator having a plurality of teeth that are opposed to the magnets and the salient poles of the rotor in the radial direction and are arranged at equal intervals in the circumferential direction,
  wherein a first auxiliary groove is formed in a surface of each salient pole that is opposed to the teeth, the first auxiliary groove having first and second side surfaces facing each other in the circumferential direction, the first side surface being closer to a circumferential center line of the salient pole than the second side surface, and
  wherein, when the angle from the circumferential center line to the first side surface of each salient pole about the axis of the rotor is represented by KC1, the opening angle between the circumferential ends of the distal end of each tooth about the axis is represented by KA, and the opening angle between the circumferential ends of each salient pole about the axis is represented by KB, the following expression is satisfied:

$$KC1 = KA - KB/2.$$

2. The motor according to claim 1, wherein the first auxiliary groove in each salient pole is one of a pair of first auxiliary grooves that are formed along the circumferential direction to be symmetrical with respect to the circumferential center line of the salient pole.

3. The motor according to claim 1, wherein the ratio W1/T between the circumferential width W1 of each first auxiliary groove and the interval T between circumferentially adjacent teeth is set to satisfy the expression $0 < W1/T < 3.5$.

4. A motor comprising:
  a rotor including:
    a rotor core;
    a plurality of magnets arranged along the circumferential direction of the rotor core, the magnets functioning as first magnetic poles; and
    a plurality of salient poles integrally formed with the rotor core, each salient pole being located between a circumferentially adjacent pair of the magnets with gaps in between, and functioning as a second magnetic pole different from the first magnetic poles; and
  a stator having a plurality of teeth that are opposed to the magnets and the salient poles of the rotor in the radial direction and are arranged at equal intervals in the circumferential direction,
  wherein a second auxiliary groove is formed in a surface of each salient pole that is opposed to the teeth, the second auxiliary groove having first and second side surfaces located close to a circumferential center line of the salient pole, the first side surface being closer to the circumferential center line of the salient pole than the second side surface, and
  wherein, when the angle from the circumferential center line to the second side surface of each salient pole about the axis of the rotor is represented by KC2, the opening angle between the circumferential ends of the distal end of each tooth about the axis is represented by KA, the opening angle between the circumferential ends of each salient pole about the axis is represented by KB, and the opening angle between each magnet and the corresponding salient pole about the axis is represented by KD, the following expression is satisfied:

$$KC2 = KA - KB/2 - KD.$$

5. The motor according to claim 4, wherein the second auxiliary groove in each salient pole is one of a pair of second auxiliary grooves that are formed along the circumferential direction to be symmetrical with respect to the circumferential center line of the salient pole.

6. The motor according to claim 4, wherein the ratio W2/T between the circumferential width W2 of each second auxiliary groove and the interval T between circumferentially adjacent teeth is set to satisfy the expression $0 < W2/T < 1.2$.

7. A motor comprising:
a rotor including:
- a rotor core;
- a plurality of magnets arranged along the circumferential direction of the rotor core, the magnets functioning as first magnetic poles; and
- a plurality of salient poles integrally formed with the rotor core, each salient pole being located between a circumferentially adjacent pair of the magnets with gaps in between, and functioning as a second magnetic pole different from the first magnetic poles; and a stator having a plurality of teeth that are opposed to the magnets and the salient poles of the rotor in the radial direction and are arranged at equal intervals in the circumferential direction, wherein a first auxiliary groove is formed in a surface of each salient pole that is opposed to the teeth, the first auxiliary groove having first and second side surfaces facing each other in the circumferential direction, the first side surface being closer to a circumferential center line of the salient pole than the second side surface, wherein a second auxiliary groove is formed in a surface of each salient pole that is opposed to the teeth, the second auxiliary groove having first and second side surfaces located close to a circumferential center line of the salient pole, the first side surface being closer to the circumferential center line of the salient pole than the second side surface, and wherein, when the angle from the circumferential center line to the first side surface of each salient pole about the axis of the rotor is represented by KC1, the opening angle between the circumferential ends of the distal end of each tooth about the axis is represented by KA, and the opening angle between the circumferential ends of each salient pole about the axis is represented by KB, the angle from the circumferential center line to the second side surface of each salient pole about the axis of the rotor is represented by KC2, and the opening angle between each magnet and the corresponding salient pole about the axis is represented by KD, the following expression is satisfied:

$KC1 = KA - KB/2$, and $KC2 = KA - KB/2 - KD$.

8. A motor comprising:
a rotor including:
- a rotor core;
- a plurality of magnets arranged along the circumferential direction of the rotor core, the magnets functioning as first magnetic poles; and
- a plurality of salient poles integrally formed with the rotor core, each salient pole being located between a circumferentially adjacent pair of the magnets with gaps in between, and functioning as a second magnetic pole different from the first magnetic poles; and a stator having a plurality of teeth that are opposed to the magnets and the salient poles of the rotor in the radial direction and are arranged at equal intervals in the circumferential direction, wherein a tooth auxiliary groove is formed in a surface of each tooth that is opposed to the magnets and the salient poles, the tooth auxiliary groove having first and second side surfaces located close to a circumferential center line of the tooth, the first side surface being closer to the circumferential center line of the tooth than the second side surface, and wherein, when the angle from the circumferential center line to the second side surface of the tooth auxiliary groove of each tooth about the axis of the rotor is represented by KC3, the opening angle between the circumferential ends of the distal end of each tooth about the axis is represented by KA, the opening angle between the circumferential ends of each salient pole about the axis is represented by KB, and the opening angle between each circumferentially adjacent pair of the teeth about the axis is represented by KE, the following expression is satisfied:

$KC3 = KA/2 + KE - KB$.

9. The motor according to claim 8, wherein the tooth auxiliary groove in each tooth is one of a pair of tooth auxiliary grooves that are formed along the circumferential direction to be symmetrical with respect to the circumferential center line of the tooth.

10. The motor according to claim 8, wherein the ratio W3/T between the circumferential width W3 of each tooth auxiliary groove and the interval T between circumferentially adjacent teeth is set to satisfy the expression 0<W3/T<1.125.

* * * * *